United States Patent
Xia et al.

(10) Patent No.: US 12,342,416 B2
(45) Date of Patent: Jun. 24, 2025

(54) METHODS, NODES AND COMPUTER READABLE MEDIUM FOR SOLVING DUAL VLR ISSUE

(71) Applicant: Telefonaktiebolaget LM Ericsson (publ), Stockholm (SE)

(72) Inventors: Lei Xia, Shanghai (CN); Zhiwei Qu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 333 days.

(21) Appl. No.: 17/795,098

(22) PCT Filed: Feb. 20, 2020

(86) PCT No.: PCT/CN2020/075980
§ 371 (c)(1),
(2) Date: Jul. 25, 2022

(87) PCT Pub. No.: WO2021/163949
PCT Pub. Date: Aug. 26, 2021

(65) Prior Publication Data
US 2022/0377525 A1   Nov. 24, 2022

(51) Int. Cl.
*H04W 8/04* (2009.01)
*H04W 8/06* (2009.01)
*H04W 8/08* (2009.01)
*H04W 68/00* (2009.01)

(52) U.S. Cl.
CPC ............. *H04W 8/04* (2013.01); *H04W 8/06* (2013.01); *H04W 8/08* (2013.01); *H04W 68/005* (2013.01)

(58) Field of Classification Search
CPC ............. H04W 8/04; H04W 8/06; H04W 8/08
See application file for complete search history.

(56) References Cited

U.S. PATENT DOCUMENTS

| | | | |
|---|---|---|---|
| 2013/0044709 A1* | 2/2013 | Adjakple | H04W 76/15 370/329 |
| 2015/0098394 A1 | 4/2015 | Corcoran et al. | |
| 2021/0022101 A1* | 1/2021 | Zhu | H04W 4/60 |

FOREIGN PATENT DOCUMENTS

| | | |
|---|---|---|
| CN | 110351800 A | 10/2019 |
| EP | 2680625 A2 | 1/2014 |
| WO | 2019127431 A1 | 7/2019 |
| WO | 2020033189 A1 | 2/2020 |

OTHER PUBLICATIONS

Ericsson, "Avoiding Dual VLR Registration for Legacy UEs, Alternative", 3GPP TSG-CT WG1 Meeting #68, C4-150501, Apr. 13-17, 2015, Bratisalva, Slovakia, 11 pages.
Extended European Search Report for European Patent Application No. 20914764.4, dated Oct. 9, 2023, 13 pages.
(Continued)

*Primary Examiner* — Won Tae C Kim
(74) *Attorney, Agent, or Firm* — Sage Patent Group

(57) ABSTRACT

The present disclosure provides methods, nodes and computer readable medium for solving a dual VLR issue. The method at a first MSC/VLR includes: determining that a dual VLR issue occurs; and transmitting a dual VLR indication to a HSS/HLR for the HSS/HLR to trigger an MME that is serving a UE to initiate a process of solving the dual VLR issue.

13 Claims, 15 Drawing Sheets

(56) References Cited

OTHER PUBLICATIONS

PCT International Search Report and Written Opinion mailed Nov. 23, 2020 for International Application No. PCT/CN2020/075980, 6 pages.

Ericsson, Nokia Networks, "Discussion on Avoiding Dual VLR Registration for Legacy Ues", 3GPP TSG CT WG1 Meeting #90, C1-150213, Feb. 2-6, 2015, Sorrento, Italy, 15 pages.

Ericsson, "Avoiding Dual VLR Registration for Legacy UEs, Alternative 2", 3GPP TSG CT4 Meeting #68bis, C4-150526, Apr. 13-17, 2015, Bratislava, Slovakia, 7 pages.

3GPP, Technical Specification Group Core Network and Terminals, Mobile Application Part (MAP) Specification (Release 14), 3GPP TS 29.002 V14.5.0 (Jun. 2019), Valbonne, France, 1021 pages.

3GPP, Technical Specification Group Core Network and Terminals, Evolved Packet System (EPS), Mobility Management Entity (MME) and Serving GPRS Support Node (SGSN) Related Interfaces Based on Diameter Protocol (Release 14), 3GPP TS 29.272 V14.8.0 (Sep. 2018), Valbonne, France, 166 pages.

3GPP, Technical Specification Group Core Network and Terminals, Mobility Management Entity (MME)—Visitor Location Register (VLR) SGs Interface Specification (Release 14), 3GPP TS 29.118 V14.2.0 (Dec. 2017), Valbonne, France, 77 pages.

* cited by examiner

HSS/HLR 1200

First MSC/VLR 1600

First MSC/VLR 1700

METHODS, NODES AND COMPUTER READABLE MEDIUM FOR SOLVING DUAL VLR ISSUE

CROSS-REFERENCE TO RELATED APPLICATIONS

This application is a 35 U.S.C. § 371 national stage application for International Application No. PCT/CN2020/075980, entitled "METHODS, NODES AND COMPUTER READABLE MEDIUM FOR SOLVING DUAL VLR ISSUE", filed on Feb. 20, 2020, the disclosures and contents of which are hereby incorporated by reference in their entireties.

TECHNICAL FIELD

The present disclosure generally relates to the technical field of communication technologies, and particularly to methods, nodes and computer readable medium for solving a dual Visitor Location Register (VLR) issue.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In 4G, the operators need to access Circuit Switch (CS) services via the Evolved Packet System (EPS) network. The voice call support could be a typical use case of communication service for access the CS domain.

An SGs interface, connecting a Mobile Switch Center/Visitor Location Register (MSC/VLR) and a Mobility Management Entity (MME), is used for registration in the MSC/VLR of a User Equipment (UE) by performing combined procedures, to page the UE on behalf of the MSC/VLR, and to convey CS-related services. By using the SGs interface, the CS call could fall back to Wideband Code Division Multiple Access (WCDMA) and Global System for Mobile Communications (GSM) to perform voice calls for a UE initially connected to EPS.

A Long Term Evolution (LTE) network may have a dual VLR registration issue, also called a dual VLR issue herein. Generally, the dual VLR issue refers to a situation where both of two MSC/VLRs regard the UE registered on the node itself, which may be caused by several reasons. The reasons for the dual VLR issue are not intended to be discussed in detail in the present disclosure. Here, only an exemplary scenario where the dual VLR issue occurs will be briefly described below for illustration.

Exemplary Scenario for Dual VLR Issue

FIG. 1 illustrates an exemplary scenario where an exemplary dual VLR issue occurs. In this exemplary scenario, a UE, via MME (represented by MME1 in FIG. 1) and an SGs interface between the MME and MSC/VLR (represented by VLR2 in FIG. 1), is associated to the MSC/VLR (i.e., VLR2). At this moment, there is a network transport failure resulting in a communication loss between the MSC/VLR (i.e., VLR2) and HLR/HSS and/or between the MSC/VLR (i.e., VLR2) and RAN (represented by Base Station Controller/Radio Network Controller (BSC/RNC) in FIG. 1).

Then, the UE falls back to 2G/3G due to e.g. Circuit Switched fallback (CSFB), no matter a Mobile Origination (MO) or an MT call. Selection of a serving MSC/VLR is done by the RAN as NMO=1 is not in use (no Gs interface), and another MSC/VLR (represented by VLR1 in FIG. 1), is selected. The UE gets registered in the HLR/HSS with the other MSC/VLR (i.e., VLR1). But the VLR2 has not received a Cancel Location message from the HLR/HSS due to the transport network failure. Then the dual VLR issue occurs, because both the VLR1 and the VLR2 regard the UE registered on the node itself. Later, when the communication towards the VLR2 is restored and after the CS call finishes, the UE returns to LTE, it makes a new Tracking Area/Location Area (TA/LA) Update, and the MME will re-select the VLR2 for serving the UE. As the UE registration in the VLR2 remains, the VLR2 considers that it served the UE before and now it should still serve the UE. Thus, the VLR2 will not send an Update Location Request to the HLR/HSS, and there will be no update from the VLR2 to the HLR/HSS. However, since the HLR/HSS does not receive any Update Location Request (from the VLR2), it considers that the VLR1 still serves the UE. Consequently, a subsequent paging for an MT CS call or an MT Short Message Service (SMS) will still be directed from the HLR/HSS towards the VLR1, and the UE is always not reachable, which will make the MT CS call or MT SMS paging failed.

3GPP has proposed some methods to solve the dual VLR issue.

One of the methods is provided for a UE of Release 11 or subsequent releases, which needs to support an Information Element (IE) "Temporary Mobile Subscriber Identity (TMSI) based Network Resource Indicator (NRI)" in an Attach/Tracking Area Update (TAU) Request message (see 3GPP Specification Change Request records for 29.118 CR 0213 Rev. 2, Current Version: 11.2.0, which is incorporated herein by reference). The TMSI based NRI may include related information of the MSC/VLR that served the UE previously. Thus, a MSC/VLR may know if it served the UE previously when the MSC/VLR receives the TMSI based NRI sent from the UE. In connection with the exemplary scenario in FIG. 1, when the UE moves from the VLR1 to the VLR2, information of the VLR1 is included in the TMSI based NRI. The TMSI based NRI is sent to the MME by the UE via the Attach/TAU Request message, and is forwarded by the MME to the VLR2 via the Location Update Request message. Thus, the VLR2 may find in the TMSI based NRI that it is the VLR1 that served the UE before. Then, the VLR2 sends an Update Location Request message to the HSS/HLR, even if the VLR2 does not receive a Cancel Location message from the HSS/HLR. As such, the HSS/HLR will update the location information of the UE to establish a connection between the VLR2 and the HSS/HLR, and send a Cancel Location message to the VLR1 to disconnect the connection between the VLR1 and the HSS/HLR, so that the dual VLR issue is solved, and the subsequent paging for an MT CS call or an MT SMS will not fail any more.

However, the above method has its own drawback. The method for the UE Release 11 or subsequent releases requires that the UE is upgraded to support the IE 'TMSI based NRI', but cannot be applied to the legacy UE, e.g., Pre-Release 11 UEs, or the UE of Release 11 (or subsequent releases) but not supporting this IE.

For the UE that cannot support the IE 'TMSI based NRI', e.g., a Pre-Release 11 UE, or a UE of Release 11 (or subsequent releases) not supporting this IE, 3GPP proposes another method for solving the dual VLR issue (see 3GPP Specification Change Request records for 29.118 CR 0228 Rev 1, Current Version:11.3.0, which is incorporated herein by reference). In this method, it is required that the MME can determine if the MSC/VLR serving the UE is changed or not. In connection with the exemplary scenario in FIG. 1, if the UE doesn't (actually, cannot) send the IE 'TMSI based NRI' in an Attach/TAU Request message, and the MME determines that the MSC/VLR serving the UE is changed from VLR1 to VLR2, the MME will fill an IE "old Location Area Identification (LAI)" with a Non-Broadcasted (NB) LAI value in a Location Update Request message to the VLR2 selected by the MME, which will force the VLR2 to send an Update Location Request message to the HSS/HLR and update the UE's information. As such, the HSS/HLR will update the location information of the UE to establish a connection between the VLR2 and the HSS/HLR, and send a Cancel Location message to the VLR1 to disconnect the connection between the VLR1 and the HSS/HLR, so that the dual VLR issue is solved, and the subsequent paging for an MT CS call or an MT SMS will not fail any more.

The above method has its own drawback, either. This method requires that the MME can determine if the MSC/VLR serving the UE is changed or not. However, it is generally difficult for the MME to determine if the serving MSC/VLR is changed or not.

It is thus desired that the dual VLR issue can be solved efficiently without the strict requirements on the MME and/or the UE, such as the UE capable of supporting the IE 'TMSI based NRI', or the MME capable of determining if the serving MSC/VLR is changed.

SUMMARY

In order to solve or at least alleviate the problems as discussed above, the present disclosure provides technical solutions for solving the dual VLR issue as follows.

According to a first aspect of the present disclosure, a method at a first MSC/VLR is provided. The method includes: determining that a dual VLR issue occurs; and transmitting a dual VLR indication to a HSS/HLR for the HSS/HLR to trigger an MME that is serving a UE to initiate a process of solving the dual VLR issue.

In an exemplary embodiment, the dual VLR indication is contained in an Update Location Request message.

In an exemplary embodiment, the method further includes: receiving, from a 2G/3G RAN, a message indicating failure of a CS call paging for the UE, wherein the dual VLR issue is determined to occur based on the received message indicating failure of the CS call paging.

According to a second aspect of the present disclosure, a method at an HSS/HLR is provided. The method includes: receiving, from a first MSC/VLR, a dual VLR indication indicating that a dual VLR issue occurs; retrieving information of an MME that is serving a UE; and transmitting a VLR registration indication to the MME indicated by the information of the MME to trigger the MME to initiate a process of solving the dual VLR issue.

In an exemplary embodiment, the dual VLR indication is contained in an Update Location Request message.

In an exemplary embodiment, the VLR registration indication is contained in an Insert Subscriber Data Request (IDR) message.

In an exemplary embodiment, the method further includes: receiving, from a second MSC/VLR that is currently selected by the MME, an Update Location Request message for updating a current location of the UE in the HSS/HLR to establish a connection between the second MSC/VLR and the HSS/HLR; and transmitting a Cancel Location message to the first MSC/VLR to disconnect a connection between the first MSC/VLR and the HSS/HLR.

According to a third aspect of the present disclosure, a method at an MME is provided. The MME includes: receiving a VLR registration indication from an HSS/HLR; and initiating a process of solving a dual VLR issue in response to the received VLR registration indication.

In an exemplary embodiment, the VLR registration indication is contained in an IDR message.

In an exemplary embodiment, the process of solving the dual VLR issue includes: transmitting a Location Update Request message with an NB-LAI to a second MSC/VLR that is currently selected by the MME to make the second MSC/VLR to update a location of the UE in the HSS/HLR.

According to a fourth aspect of the present disclosure, a method at a first MSC/VLR is provided. The method includes: determining that a dual VLR issue occurs; transmitting, to an HSS/HLR, a message for querying information of an MME that is serving a UE; receiving the information of the MME from the HSS/HLR; and transmitting a VLR registration indication to the MME indicated by the information of the MME to trigger the MME to initiate a process of solving the dual VLR issue.

In an exemplary embodiment, the message for querying information of the MME is a Send Routing Information message with an International Mobile Subscriber Identity (IMSI) of the UE; and the information of the MME includes an SGs interface address of the MME, and is contained in a Send Routing Information Answer message.

In an exemplary embodiment, the VLR registration indication is contained in an SGsAP-PAGING-REQUEST message.

In an exemplary embodiment, the method further includes: receiving, from a 2G/3G RAN, a message indicating failure of CS call paging for the UE, wherein the dual VLR issue is determined to occur based on the received message indicating failure of CS call paging.

According to a fifth aspect of the present disclosure, a method at an HSS/HLR is provided. The method includes: receiving, from a first MSC/VLR, a message for querying information of an MME that is serving a UE, in response to the first MSC/VLR determining that a dual VLR issue occurs; retrieving the information of the MME; and transmitting the information of the MME to the first MSC/VLR.

In an exemplary embodiment, the message for querying information of the MME is a Send Routing Information message with an IMSI of the UE; and the information of the MME includes an SGs interface address of the MME, and is contained in a Send Routing Information Answer message.

In an exemplary embodiment, the method further includes: receiving, from a second MSC/VLR that is currently selected by the MME, an Update Location Request message for updating a current location of the UE in the HSS/HLR to establish a connection between the second MSC/VLR and the HSS/HLR; and transmitting a Cancel Location message to the first MSC/VLR to disconnect a connection between the first MSC/VLR and the HSS/HLR.

According to a sixth aspect of the present disclosure, a method at an MME is provided. The method includes: receiving a VLR registration indication from a first MSC/VLR; and initiating a process of solving a dual VLR issue in response to the received VLR registration indication.

In an exemplary embodiment, the VLR registration indication is contained in an SGsAP-PAGING-REQUEST message.

In an exemplary embodiment, the process of solving the dual VLR issue includes: transmitting a Location Update Request message with an NB-LAI to a second MSC/VLR that is currently selected by the MME to make the second MSC/VLR to update a location of the UE in the HSS/HLR.

According to a seventh aspect of the present disclosure, a first MSC/VLR is provided. The first MSC/VLR includes: at least one processor, and at least one memory, storing instructions which, when executed on the at least one processor, cause the first MSC/VLR to perform the method according to the first or fourth aspect of the present disclosure.

According to an eighth aspect of the present disclosure, an HSS/HLR is provided. The HSS/HLR includes: at least one processor, and at least one memory, storing instructions which, when executed on the at least one processor, cause the HSS/HLR to perform the method according to the second or fifth aspect of the present disclosure.

According to a ninth aspect of the present disclosure, an MME is provided. The MME includes: at least one processor, and at least one memory, storing instructions which, when executed on the at least one processor, cause the MME to perform the method according to the third or sixth aspect of the present disclosure.

According to a tenth aspect of the present disclosure, a computer readable storage medium is provided. The computer readable storage medium has computer program instructions stored thereon, the computer program instructions, when executed by at least one processor, causing the at least one processor to perform the method according to any of the first to sixth aspects of the present disclosure.

The technical solutions of the present disclosure may solve the dual VLR issue efficiently without the strict requirements on the MME and/or the UE, such as the UE capable of supporting the IE 'TMSI based NRI', or the MME capable of determining if the serving MSC/VLR is changed.

BRIEF DESCRIPTION OF THE DRAWINGS

The objects, advantages and characteristics of the present disclosure will be more apparent, according to descriptions of preferred embodiments in connection with the drawings, in which.

Figure 1:
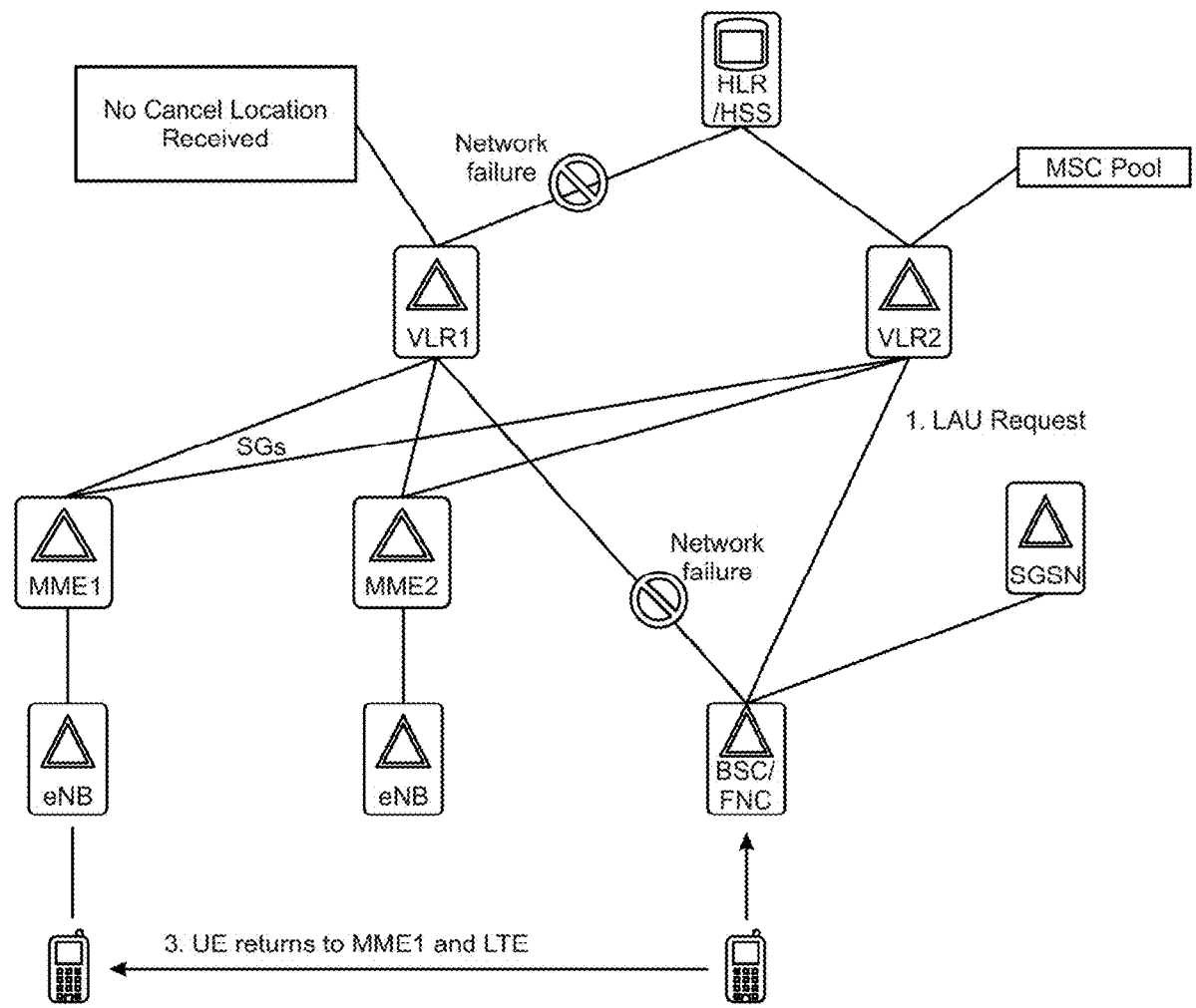
FIG. 1 schematically shows an exemplary scenario where a dual VLR issue occurs to which a method for solving a dual VLR issue according to embodiments of the present disclosure is applied.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be liming of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "and/or" includes any and all combinations of one or more of the associated listed terms.

In the following description and claims, unless defined otherwise, all technical and scientific terms used herein have the same meaning as commonly understood by one of ordinary skills in the art to which this disclosure belongs.

The present disclosure intends to solve the dual VLR issue. As previously described, the dual VLR issue refers to a situation where both of two MSC/VLRs regard the UE registered on the node itself, which may be caused by several reasons. It should be understood that the present disclosure does not focus on the reasons for the dual VLR issue, but aims at solutions for solving the dual VLR issue occurred. The technical solutions of the present disclosure can be applied to solve the dual VLR issue caused by various reasons. Hereinafter, the technical solutions of the present disclosure will be described in an exemplary scenario where the dual VLR issue occurs in a CSFB to 2G/3G procedure as shown in FIG. 1, only for illustration but not for any limitation.

In this exemplary scenario, a UE, via MME (represented by MME1 in FIG. 1) and an SGs interface between the MME and a second MSC/VLR (represented by VLR2 in FIG. 1), is associated to the second MSC/VLR (i.e., VLR2). At this moment, there is a network transport failure resulting in a communication loss between the second MSC/VLR (i.e., VLR2) and HLR/HSS and/or between the second MSC/VLR (i.e., VLR2) and RAN (represented by BSC/RNC in FIG. 1). Then, the UE falls back to 2G/3G due to e.g. CSFB, no matter an MO or an MT call. Selection of a serving MSC/VLR is done by the RAN as NMO=1 is not in use (no Gs interface), and a first MSC/VLR (represented by VLR1 in FIG. 1) is selected. The UE gets registered in the HLR/HSS with the first MSC/VLR (i.e., VLR1). But the second MSC/VLR (i.e., VLR2) has not received a Cancel Location message from the HLR/HSS due to the transport network failure. Then the dual VLR issue occurs, because both the first MSC/VLR and the second MSC/VLR regard the UE registered on the node itself. Later, when the communication towards the second MSC/VLR (i.e., VLR2) is restored and after the CS call finishes, the UE returns to LTE, it makes a new Tracking Area/Location Area (TA/LA) Update, and the MME will re-select the second MSC/VLR (i.e., VLR2) for serving the UE. As the UE registration in the second MSC/VLR (i.e., VLR2) remains, the second MSC/VLR (i.e., VLR2) considers that it served the UE before and now it should still serve the UE. Thus, the second MSC/VLR (i.e., VLR2) will not send an Update Location Request to the HLR/HSS, and there will be no update from the second MSC/VLR (i.e., VLR2) to the HLR/HSS. However, since the HLR/HSS does not receive any Update Location Request (from the second MSC/VLR (i.e., VLR2)), it considers that the first MSC/VLR (i.e., VLR1) still serves the UE. Consequently, a subsequent paging for an MT CS call or an MT SMS will still be directed from the HLR/HSS towards the first MSC/VLR (i.e., VLR1), and the UE is always not reachable, which will make the MT CS call or MT SMS paging failed.

The basic idea of the technical solutions of the present disclosure mainly consist in relying on the first MSC/VLR that is considered by the HSS/VLR to be serving the UE (but is actually not serving the UE) to determine the dual VLR issue by receiving a message indicating failure of the CS call paging for the UE, so as to trigger an MME serving the UE to initiate a process of solving the dual VLR issue, i.e., to force the MME to transmit an NB-LAI to the second MSC/VLR that is currently selected by the MME for serving the UE to make the second MSC/VLR to update the location of the UE in the HSS/HLR. Accordingly, the HSS/HLR may establish a connection between the second MSC/VLR and the HSS/HLR, and disconnect the connection between the first MSC/VLR and the HSS/HLR. As such, the dual VLR issue can be solved, and the subsequent paging for an MT CS call or an MT SMS will be directed to the correct MSC/VLR that is currently serving the UE, and will not fail.

In particular, the present disclosure proposes two technical solutions:

1) Solution 1: after CS call paging is failed, the first MSC/VLR (e.g., VLR1 in FIG. 1) determines that the dual VLR issue occurs, and informs the HLR/HSS. Then, the HLR/HSS finds the serving MME (e.g., MME1 in FIG. 1) for this UE, which has registered UE information in the HLR/HSS in the TAU procedure after the CS call is finished. And the HLR/HSS tells the MME its registered/serving VLR for this UE is the first MSC/VLR (e.g., VLR1 in FIG. 1), i.e. asking the MME to determine whether the MSC/VLR serving the UE is changed. Then, the MME may initiate an IMSI detach to the UE, which in turn transmits a combined TAU request to the MME. During the combined TAU, the MME will fill an IE "old LAI" with an NB-LAI value in a Location Update Request message to the second MSC/VLR (e.g., VLR2 in FIG. 1) selected by the MME, which will force the second MSC/VLR to send an Update Location Request message to the HSS/HLR and update the UE's information. As such, the HSS/HLR will update the location information of the UE to establish a connection between the second MSC/VLR and the HSS/HLR, and send a Cancel Location message to the first MSC/VLR to disconnect the connection between the first MSC/VLR and the HSS/HLR, so that the dual VLR issue is solved, and the subsequent paging for an MT CS call or an MT SMS will be directed to the correct MSC/VLR that is currently serving the UE, and will not fail.

2) Solution 2: after CS call paging is failed, the first MSC/VLR (e.g., VLR1 in FIG. 1) determines that the dual VLR issue occurs, and queries the HSS/HLR for information (e.g., SGs interface address) of an MME that is serving the UE by transmitting a message for querying the information of the MME to the HLR/HSS. After the HLR/HSS tells the first MSC/VLR about the information of the serving MME for this UE, which is registered in the HLR/HSS in Update Location Request of TAU procedure after the CS call is finished, the first MSC/VLR informs the MME that the first MSC/VLR is registered in the HLR/HSS, i.e., asking the MME to determine whether the MSC/VLR serving the UE is changed. Then, the MME may initiate an IMSI detach to the UE, which in turn transmits a combined TAU request to the MME. During combined TAU, the MME will fill an IE "old LAI" with an NB-LAI value in a Location Update Request message to the second MSC/VLR (e.g., VLR2 in FIG. 1) selected by the MME, which will force the second MSC/VLR to send an Update Location Request message to the HSS/HLR and update the UE's information. As such, the HSS/HLR will update the location information of the UE to establish a connection between the second MSC/VLR and the HSS/HLR, and send a Cancel Location message to the first MSC/VLR to disconnect the connection between the first MSC/VLR and the HSS/HLR, so that the dual VLR issue is solved, and the subsequent paging for an MT CS call or an MT SMS will be directed to the correct MSC/VLR that is currently serving the UE, and will not fail.

In both Solution 1 and Solution 2, it is the first MSC/VLR that is considered by the HSS/VLR to be serving the UE (but actually is not serving the UE) to determine the occurrence of the dual VLR issue by receiving the message indicating failure of a CS call paging for the UE, so as to trigger an MME serving the UE to initiate a process of solving the dual VLR issue. The only difference between Solution 1 and Solution 2 consists in who informs the MME to initiate the process of solving the dual VLR issue. In Solution 1, it is the HSS/HLR that informs the MME serving the UE to initiate the process of solving the dual VLR issue; while in Solution 2, it is the first MSC/VLR that informs the MME serving the UE to initiate the process of solving the dual VLR issue by retrieving the information of the MME from the HSS/HLR.

Hereinafter, a method for solving a dual VLR issue at a first MSC/VLR according to a first exemplary embodiment (i.e., Solution 1) of the present disclosure will be described with reference to FIG. 2.

In conjunction with the exemplary scenario in FIG. 1, the UE gets registered in the HLR/HSS with the first MSC/VLR (i.e., VLR1), but the second MSC/VLR (i.e., VLR2) has not received a Cancel Location message from the HLR/HSS due to the transport network failure. Then the dual VLR issue occurs. When the communication towards the second MSC/VLR (i.e., VLR2) is restored and after the CS call finishes, the UE returns to LTE from 2G/3G, and the MME will re-select the second MSC/VLR (i.e., VLR2 in FIG. 1) for serving the UE. As the UE registration in the second MSC/VLR (i.e., VLR2 in FIG. 1) remains, the second MSC/VLR (i.e., VLR2 in FIG. 1) considers that it served the UE before and now it should still serve the UE. Thus, the second MSC/VLR (i.e., VLR2 in FIG. 1) will not send an Update Location Request to the HLR/HSS, and there will be no update from the second MSC/VLR (i.e., VLR2 in FIG. 1) to the HLR/HSS. However, since the HLR/HSS does not receive any Update Location Request (from the second MSC/VLR (i.e., VLR2 in FIG. 1)), it considers that the first MSC/VLR (i.e., VLR1 in FIG. 1) still serves the UE. Consequently, a subsequent paging for an MT CS call or an MT SMS will still be directed from the HLR/HSS towards the first MSC/VLR (i.e., VLR1 in FIG. 1), and the UE is always not reachable, which will make the MT CS call or MT SMS paging failed.

Hence, the first MSC/VLR is an MSC/VLR that is considered by the HSS/VLR to be serving the UE, but is actually not serving the UE.

Figure 2:
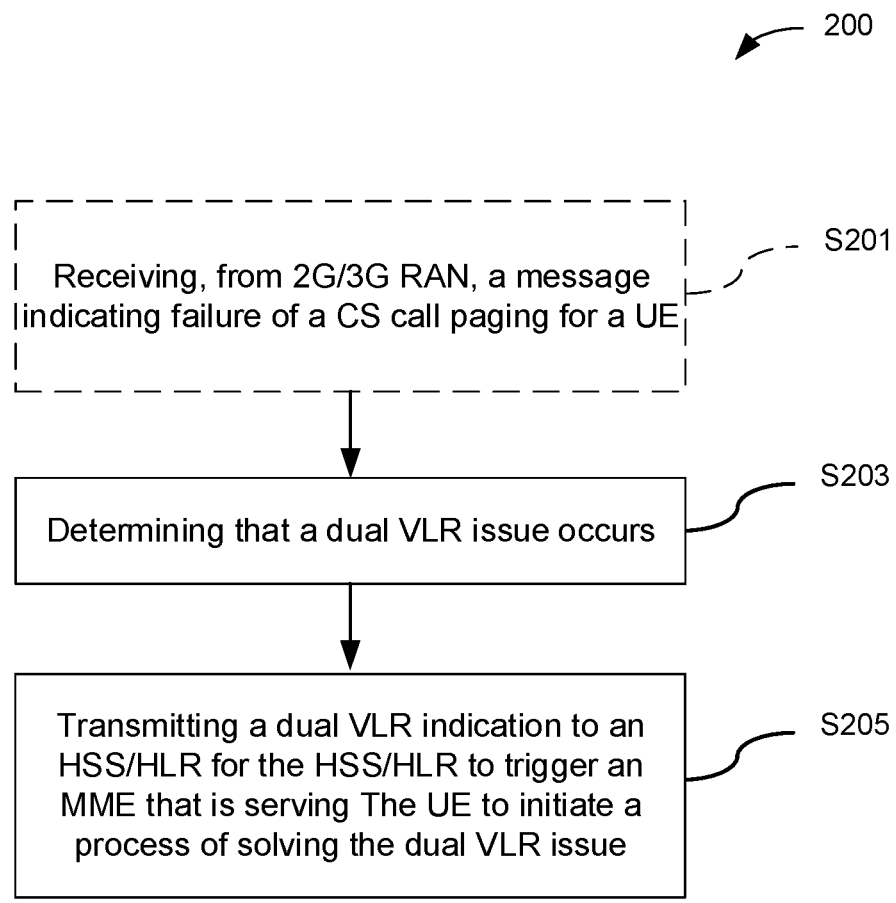
FIG. 2 schematically shows a method for solving a dual VLR issue at a first MSC/VLR according to a first exemplary embodiment of the present disclosure.

As shown in FIG. 2, the method 200 includes steps S201~S205.

In step S201, the first MSC/VLR may receive, from a 2G/3G RAN, a message indicating failure of a CS call paging for a UE, since the first MSC/VLR is actually not serving the UE.

Thus, in step S203, the first MSC/VLR may determine that a dual VLR issue occurs based on the received message indicating failure of the CS call paging.

The first MSC/VLR may generate a dual VLR indication indicating that the dual VLR issue occurs.

Then, in step S205, the first MSC/VLR may transmit the dual VLR indication indicating that the dual VLR issue occurs to a HSS/HLR for the HSS/HLR to trigger an MME that is serving the UE to initiate a process of solving the dual VLR issue. In particular, the first MSC/VLR may inform the HSS/HLR that the dual VLR issue occurs, and that the HSS/HLR needs to find an MSC/VLR that is currently serving the UE by finding an MME that is serving the UE to initiate the process of solving the dual VLR issue, which will be described in detail later.

In an exemplary embodiment, the dual VLR indication may be contained in an Update Location Request message from the first MSC/VLR to the HSS/HLR.

Hereinafter, a method for solving the dual VLR issue at the HSS/HLR according to the first exemplary embodiment of the present disclosure will be described with reference to FIG. 3.

Figure 3:
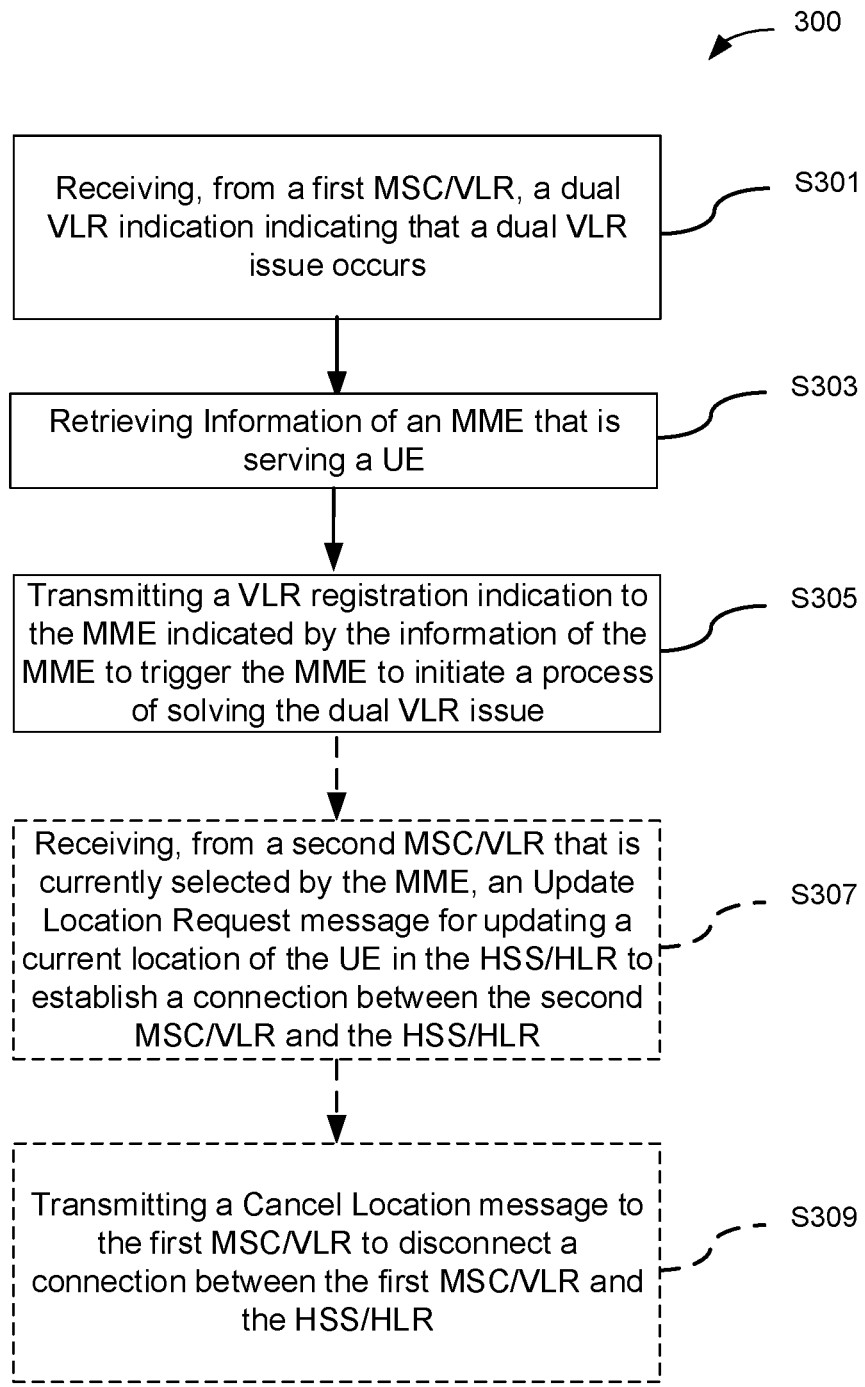
FIG. 3 schematically shows a method for solving a dual VLR issue at an HSS/HLR according to the first exemplary embodiment of the present disclosure.

As shown in FIG. 3, the method 300 includes steps S301-S305.

In step S301, the HSS/HLR may receive, from the first MSC/VLR, a dual VLR indication indicating that a dual VLR issue occurs. As previously described, the dual VLR indication is generated by the first MSC/VLR upon determining that the dual VLR issue occurs based on the message, received by the first MSC/VLR, indicating failure of the CS call paging for a UE.

In an exemplary embodiment, the dual VLR indication is contained in an Update Location Request message.

In step S303, the HSS/HLR may retrieve information of an MME that is serving the UE. As known by the skilled in the art, the HSS/HLR is a combined node and has data communication between the HSS and the HLR internally, wherein the HLR serves in 2G/3G, and the HSS serves in LTE. When the UE moves back to the LTE, the serving MME may tell its information, such as registration information, location information, to the HSS. Thus, the HSS knows the MME that is currently serving the UE. When the HLR receives the dual VLR indication in the Update Location Request message from the first MSC/VLR, the HLR may retrieve the information of the serving MME from the HSS.

In step S305, the HSS/HLR may transmit a VLR registration indication to the MME indicated by the information of the MME to trigger the MME to initiate the process of solving the dual VLR issue.

In an exemplary embodiment, the VLR registration indication is contained in an IDR message. For example, the VLR registration indication may be in a form of a new bit "Perform VLR Registration" contained in IDR flags in the IDR message.

In an exemplary embodiment, the method 300 may further includes steps S307 and S309.

In step S307, the HSS/HLR may receive, from a second MSC/VLR that is currently selected by the MME for serving the UE, an Update Location Request message for updating a current location of the UE in the HSS/HLR to establish a connection between the second MSC/VLR and the HSS/HLR.

In step S309, the HSS/HLR may transmit a Cancel Location message to the first MSC/VLR to disconnect a connection between the first MSC/VLR and the HSS/HLR.

As such, the dual VLR issue can be solved, and the subsequent paging for an MT CS call or an MT SMS will be directed to the correct MSC/VLR that is currently serving the UE, and will not fail.

Hereinafter, a method for solving the dual VLR issue at the MME according to the first exemplary embodiment of the present disclosure will be described with reference to FIG. 4.

Figure 4:
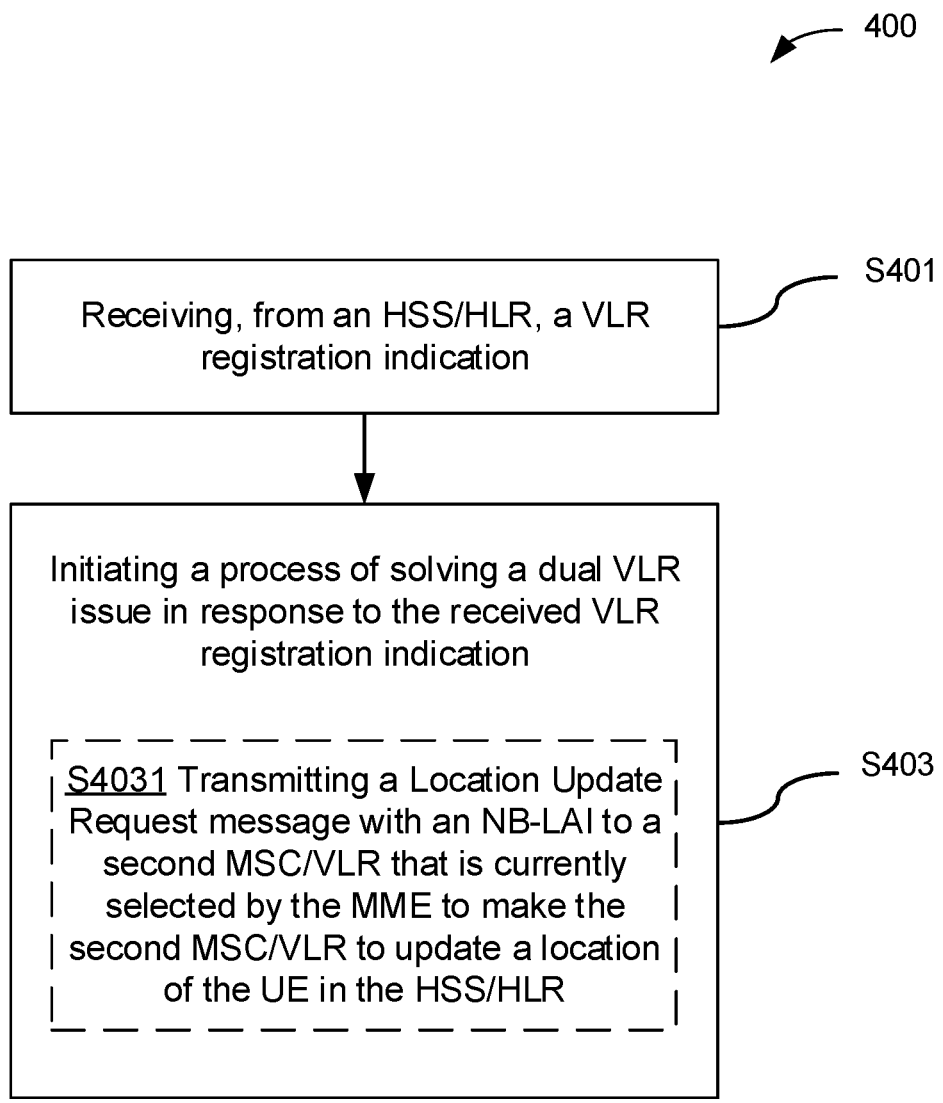
FIG. 4 schematically shows a method for solving a dual VLR issue at an MME according to the first exemplary embodiment of the present disclosure.

As shown in FIG. 4, the method 400 includes steps S401 and S403.

In step S401, the MME may receive a VLR registration indication from the HSS/HLR.

In an exemplary embodiment, the VLR registration indication is contained in an IDR message.

In step S403, the MME may initiate the process of solving the dual VLR issue in response to the received VLR registration indication. In particular, the MME may be triggered to transmit an NB-LAI to the second MSC/VLR that is currently selected by the MME for serving the UE to make the second MSC/VLR to update the location of the UE in the HSS/HLR.

In an exemplary embodiment, the MME receiving the received VLR registration indication knows that the dual VLR issue occurs and determines that the MSC/VLR serving the UE is changed. Then, the MME may initiate an IMSI detach to the UE, which in turn transmits a combined TAU request to the MME. During the combined TAU, the MME will fill an IE "old LAI" with an NB-LAI value in a Location Update Request message, and transmit the Location Update Request message the NB-LAI value to the second MSC/VLR selected by the MME, which will force the second MSC/VLR to send an Update Location Request message to the HSS/HLR and update the UE's information.

Thus, step S403 may further include a step S4031 of transmitting a Location Update Request message with an NB-LAI to a second MSC/VLR that is currently selected by the MME for serving the UE to make the second MSC/VLR to update a location of the UE in the HSS/HLR.

As such, the HSS/HLR will update the location information of the UE to establish a connection between the second MSC/VLR and the HSS/HLR, and transmit a Cancel Location message to the first MSC/VLR to disconnect the connection between the first MSC/VLR and the HSS/HLR, so that the dual VLR issue is solved, and the subsequent paging for an MT CS call or an MT SMS will be directed to the correct MSC/VLR that is currently serving the UE, and will not fail.

Figure 5:
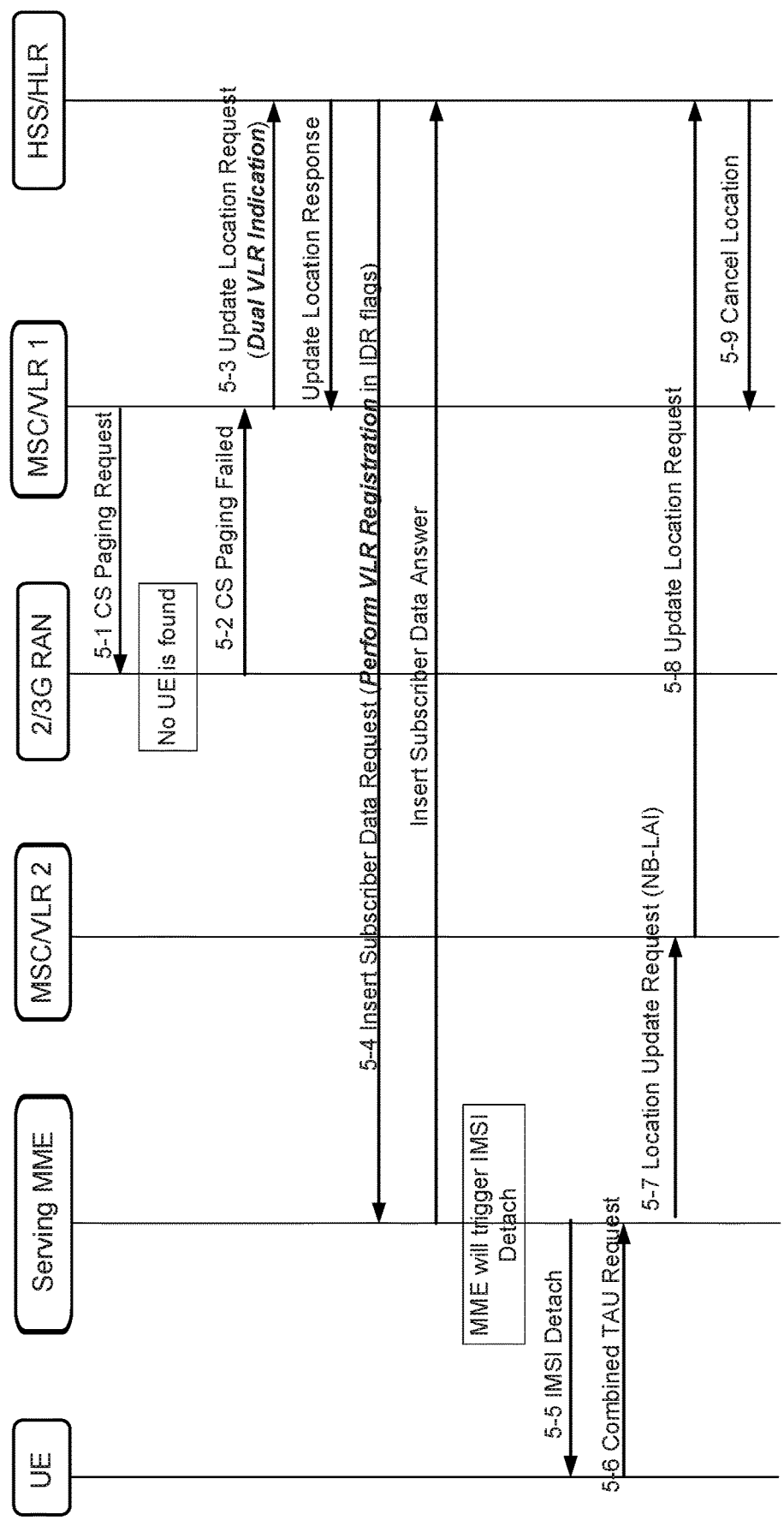
FIG. 5 schematically shows a signaling sequence diagram to which a method for solving a dual VLR issue according to the first embodiment of the present disclosure is applied.

Hereinafter, the method for solving the dual VLR issue according to the first exemplary embodiment (i.e., Solution 1) of the present disclosure will be described in detail in conjunction with a signaling sequence diagram as shown in FIG. 5. In connection with the signaling sequence diagrams of FIG. 5, the method for solving the dual VLR issue according to the first exemplary embodiment (i.e., Solution 1) of the present disclosure as previously described will be understood better.

FIG. 5 schematically shows a signaling sequence diagram to which a method for solving a dual VLR issue according to the first embodiment of the present disclosure is applied. It should be noted that the description below only focuses on signaling related to Solution 1, and other signaling is omitted to avoid obscuring the principle of the present disclosure. In FIG. 5, modification on the signaling related to Solution 1 is shown in Bold Italics.

As previously described, the first MSC/VLR is an MSC/VLR that is considered by the HSS/VLR to be serving the UE, but is actually not serving the UE. Therefore, when the first MSC/VLR transmits a CS Paging Request message to 2G/3G RAN in Signaling 5-1, the 2G/3G RAN cannot find the UE, and thus transmits a CS Paging Failed message to the first MSC/VLR in Signaling 5-2.

The first MSC/VLR may determine that the dual VLR issue occurs based on the received CS Paging Failed message, and thus may generate a dual VLR indication indicating that the dual VLR issue occurs.

Then in Signaling 5-3, the first MSC/VLR may transmit the dual VLR indication, e.g., in an Update Location Request message, indicating that the dual VLR issue occurs to the HSS/HLR, for the HSS/HLR to trigger the MME that is serving the UE to initiate the process of solving the dual VLR issue.

The HSS/HLR that receives the dual VLR indication may retrieve information of the MME that is serving the UE.

Then in Signaling 5-4, the HSS/HLR may transmit a VLR registration indication, e.g., in an IDR message, to the MME indicated by the information of the MME to trigger the MME to initiate the process of solving the dual VLR issue. For example, the HSS/HLR may transmit an IDR message with IDR flags containing a new bit "Perform VLR Registration".

After receiving the VLR registration indication from the HSS/HLR, the MME may know that the dual VLR issue occurs and determine that the MSC/VLR serving the UE is changed. Then, the MME may initiate, in Signaling 5-5, an IMSI detach to the UE, which in turn transmits a combined TAU request to the MME in Signaling 5-6. During the combined TAU, the MME will fill an IE "old LAI" with an NB-LAI value in a Location Update Request message, and transmit the Location Update Request message with the NB-LAI value to the second MSC/VLR selected by the MME for serving the UE in Signaling 5-7.

Then, the second MSC/VLR that receives the Location Update Request message with the NB-LAI value from the MME transmits an Update Location Request message to the HSS/HLR in Signaling 5-8 to update the UE's information.

As such, the HSS/HLR may update the location information of the UE to establish a connection between the second MSC/VLR and the HSS/HLR.

The HSS/HLR may transmit, in Signaling 5-9, a Cancel Location message to the first MSC/VLR to disconnect the connection between the first MSC/VLR and the HSS/HLR.

Thus, the dual VLR issue may be solved, and the subsequent paging for an MT CS call or an MT SMS will be directed to the correct MSC/VLR that is currently serving the UE, and will not fail.

Figure 6:
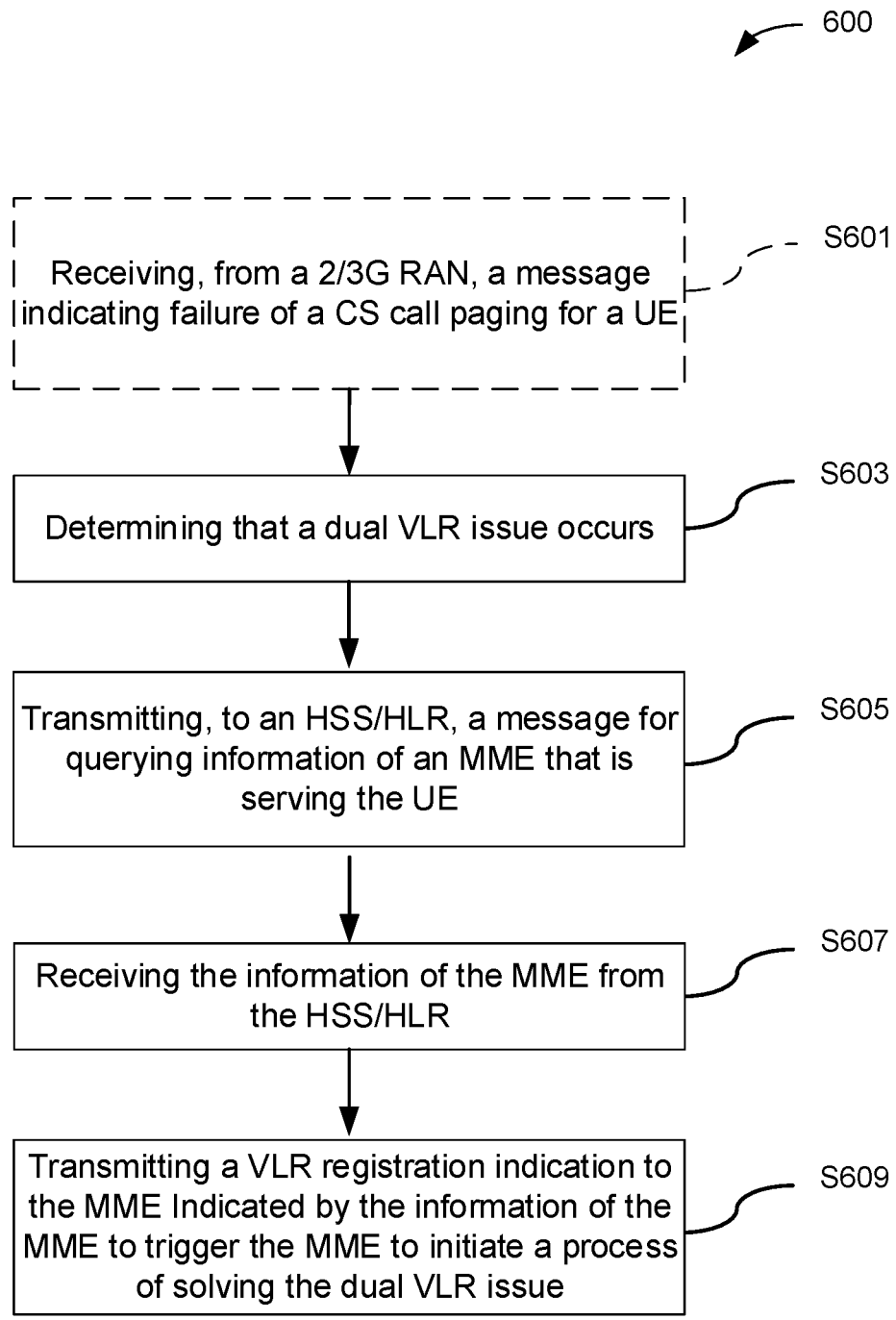
FIG. 6 schematically shows a method for solving a dual VLR issue at a first MSC/VLR according to a second exemplary embodiment of the present disclosure.

Hereinafter, a method for solving a dual VLR issue at a first MSC/VLR according to a second exemplary embodiment (i.e., Solution 2) of the present disclosure will be described with reference to FIG. 6.

As described previously, in both Solution 1 and Solution 2, it is the first MSC/VLR that is considered by the HSS/VLR to be serving the UE (but actually is not serving the UE) to determine the occurrence of the dual VLR issue by receiving the message indicating failure of a CS call paging for the UE, so as to trigger an MME serving the UE to initiate a process of solving the dual VLR issue. The only difference between Solution 1 and Solution 2 consists in who informs the MME to initiate the process of solving the dual VLR issue. In Solution 1, it is the HSS/HLR that informs the MME serving the UE to initiate the process of solving the dual VLR issue; while in Solution 2, it is the first MSC/VLR that informs the MME serving the UE to initiate the process of solving the dual VLR issue by retrieving the information of the MME from the HSS/HLR. Therefore, the following description focuses on the difference of the Solution 2 from Solution 1, and other description may refer back to those made with reference to FIG. 2.

As described previously, the first MSC/VLR is an MSC/VLR that is considered by the HSS/VLR to be serving the UE, but is actually not serving the UE.

In step S601, the first MSC/VLR may receive, from a 2G/3G RAN, a message indicating failure of a CS call paging for a UE, since the first MSC/VLR is actually not serving the UE.

Thus, in step S603, the first MSC/VLR may determine that a dual VLR issue occurs based on the received message indicating failure of the CS call paging.

The first MSC/VLR may generate a message for querying information of an MME that is serving the UE upon determining that the dual VLR issue occurs.

Then, in step S605, the first MSC/VLR may transmit, to an HSS/HLR, the message for querying information of an MME that is serving the UE. That is, the first MSC/VLR lets the HSS/HLR query the information of the MME that is serving the UE.

In an exemplary embodiment, the message for querying information of the MME may be a Send Routing Information message with an IMSI of the UE.

In step S607, the first MSC/VLR may receive the information of the MME from the HSS/HLR.

In an exemplary embodiment, the information of the MME may include an SGs interface address of the MME, and may be contained in a Send Routing Information Answer message.

In step S609, the first MSC/VLR may transmit a VLR registration indication to the MME indicated by the information of the MME to trigger the MME to initiate the process of solving the dual VLR issue.

In an exemplary embodiment, the VLR registration indication is contained in an SGsAP-PAGING-REQUEST message. For example, the VLR registration indication may be in a form of a new bit "Perform VLR Registration" contained in the SGsAP-PAGING-REQUEST message.

In particular, the first MSC/VLR may determine that the dual VLR issue occurs based on the received message indicating failure of CS call paging, and retrieve, from the HSS/HLR, information of the MME that is serving the UE. Then, the first MSC/VLR may directly trigger the MME to initiate the process of solving the dual VLR issue.

Hereinafter, a method for solving the dual VLR issue at the HSS/HLR according to the second exemplary embodiment of the present disclosure will be described with reference to FIG. 7.

Figure 7:
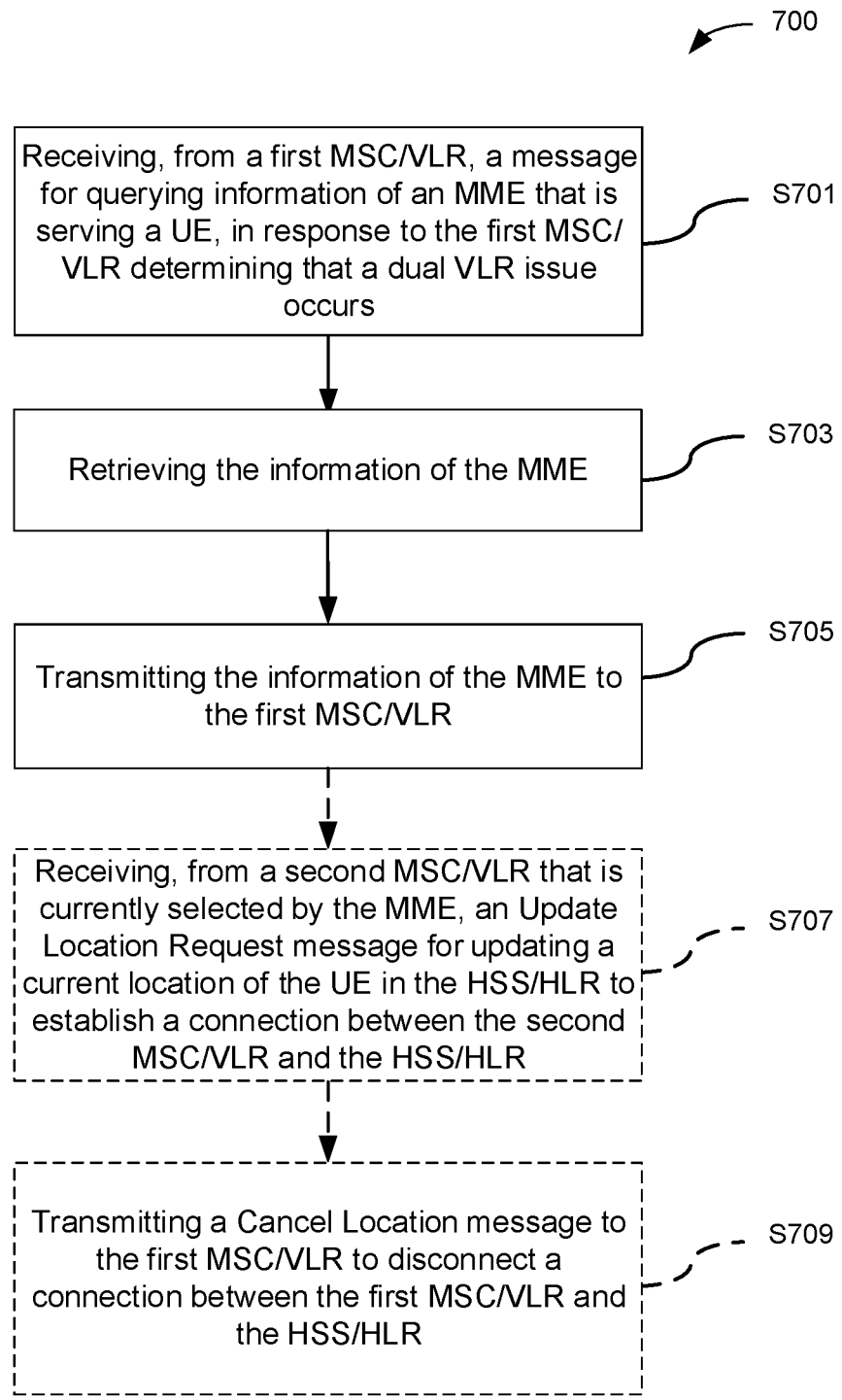
FIG. 7 schematically shows a method for solving a dual VLR issue at an HSS/HLR according to the second exemplary embodiment of the present disclosure.

As shown in FIG. 7, the method 700 includes steps S701-S705.

In step S701, the HSS/HLR may receive, from the first MSC/VLR, a message for querying information of the MME that is serving the UE, in response to the first MSC/VLR determining that the dual VLR issue occurs. As previously described, the message for querying information of the MME that is serving the UE is generated by the first MSC/VLR upon determining that the dual VLR issue occurs based on the message, received by the first MSC/VLR, indicating failure of the CS call paging for a UE.

In an exemplary embodiment, the message for querying information of the MME may be a Send Routing Information message with an IMSI of the UE.

In step S703, the HSS/HLR may retrieve the information of the MME that is serving the UE. As known by the skilled in the art, the HSS/HLR is a combined node and has data communication between the HSS and the HLR internally, wherein the HLR serves in 2G/3G, and the HSS serves in LTE. When the UE moves back to the LTE, the serving MME may tell its information, such as registration information, location information, to the HSS. Thus, the HSS knows the MME that is currently serving the UE. When the HLR receives the dual VLR indication in the Update Location Request message from the first MSC/VLR, the HLR may retrieve the information of the serving MME from the HSS.

In an exemplary embodiment, the information of the MME includes an SGs interface address of the MME.

In step S705, the HSS/HLR may transmit the information of the MME to the first MSC/VLR.

In an exemplary embodiment, the information of the MME is contained in a Send Routing Information Answer message.

In an exemplary embodiment, the method 700 may further includes steps S707 and S709.

In step S707, the HSS/HLR may receive, from a second MSC/VLR that is currently selected by the MME for serving the UE, an Update Location Request message for updating a current location of the UE in the HSS/HLR to establish a connection between the second MSC/VLR and the HSS/HLR.

In step S709, the HSS/HLR may transmit a Cancel Location message to the first MSC/VLR to disconnect a connection between the first MSC/VLR and the HSS/HLR.

As such, the dual VLR issue can be solved, and the subsequent paging for an MT CS call or an MT SMS will be directed to the correct MSC/VLR that is currently serving the UE, and will not fail.

Hereinafter, a method for solving the dual VLR issue at the MME according to the second exemplary embodiment of the present disclosure will be described with reference to FIG. 8.

Figure 8:
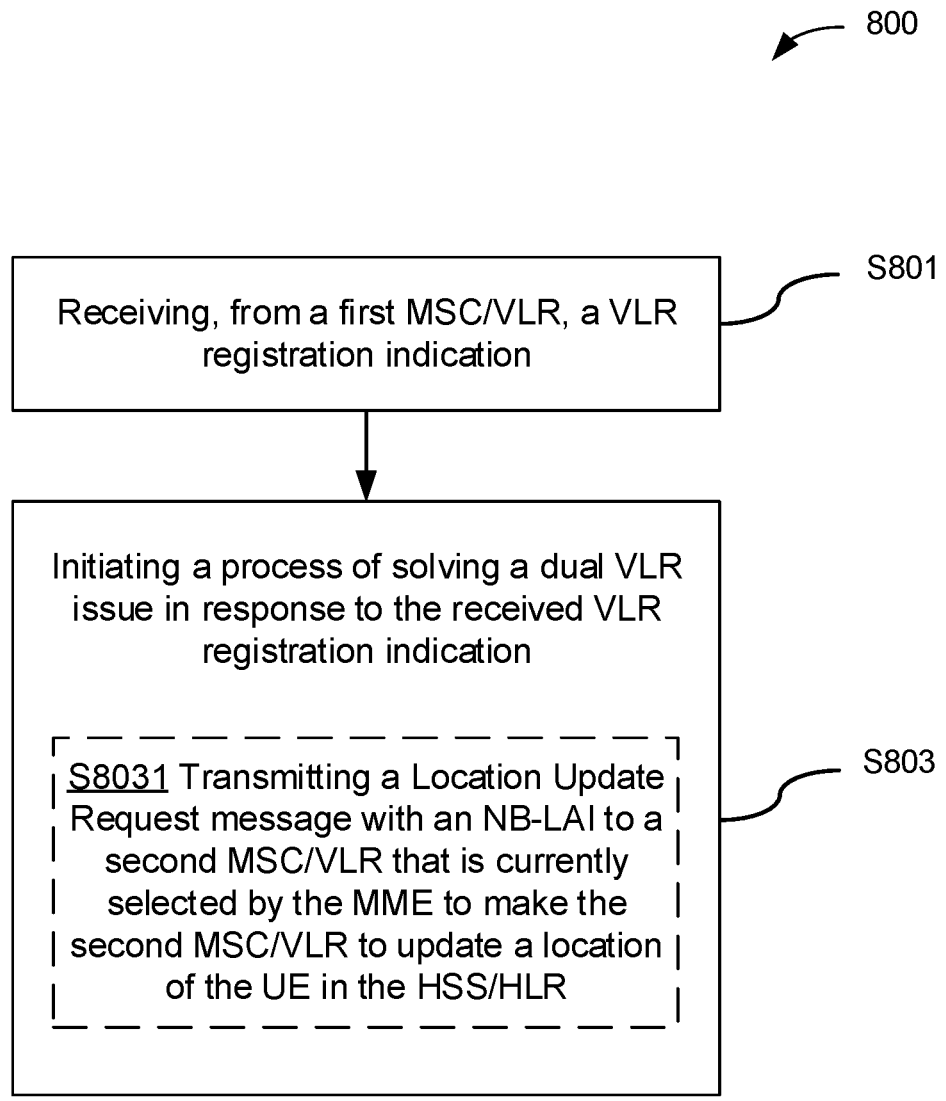
FIG. 8 schematically shows a method for solving a dual VLR issue at an MME according to the second exemplary embodiment of the present disclosure.

As shown in FIG. 8, the method 800 includes steps S801 and S803.

In step S801, the MME may receive the VLR registration indication from the first MSC/VLR for trigger the MME to initiate the process of solving the dual VLR issue.

In an exemplary embodiment, the VLR registration indication is contained in an SGsAP-PAGING-REQUEST message. For example, the VLR registration indication may be in a form of a new bit "Perform VLR Registration" contained in the SGsAP-PAGING-REQUEST message.

In step S803, the MME may initiate the process of solving the dual VLR issue in response to the received VLR registration indication. In particular, the MME may be triggered to transmit an NB-LAI to the second MSC/VLR that is currently selected by the MME for serving the UE to make the second MSC/VLR to update the location of the UE in the HSS/HLR.

In an exemplary embodiment, the MME receiving the received VLR registration indication knows that the dual VLR issue occurs and determines that the MSC/VLR serving the UE is changed. Then, the MME may initiate an IMSI detach to the UE, which in turn transmits a combined TAU request to the MME. During the combined TAU, the MME will fill an IE "old LAI" with an NB-LAI value in a Location Update Request message, and transmit the Location Update Request message the NB-LAI value to the second MSC/VLR selected by the MME, which will force the second MSC/VLR to send an Update Location Request message to the HSS/HLR and update the UE's information.

Thus, step S803 may further include a step S8031 of transmitting a Location Update Request message with an NB-LAI to a second MSC/VLR that is currently selected by the MME for serving the UE to make the second MSC/VLR to update a location of the UE in the HSS/HLR.

As such, the HSS/HLR will update the location information of the UE to establish a connection between the second MSC/VLR and the HSS/HLR, and transmit a Cancel Location message to the first MSC/VLR to disconnect the connection between the first MSC/VLR and the HSS/HLR, so that the dual VLR issue is solved, and the subsequent paging for an MT CS call or an MT SMS will be directed to the correct MSC/VLR that is currently serving the UE, and will not fail.

Figure 9:
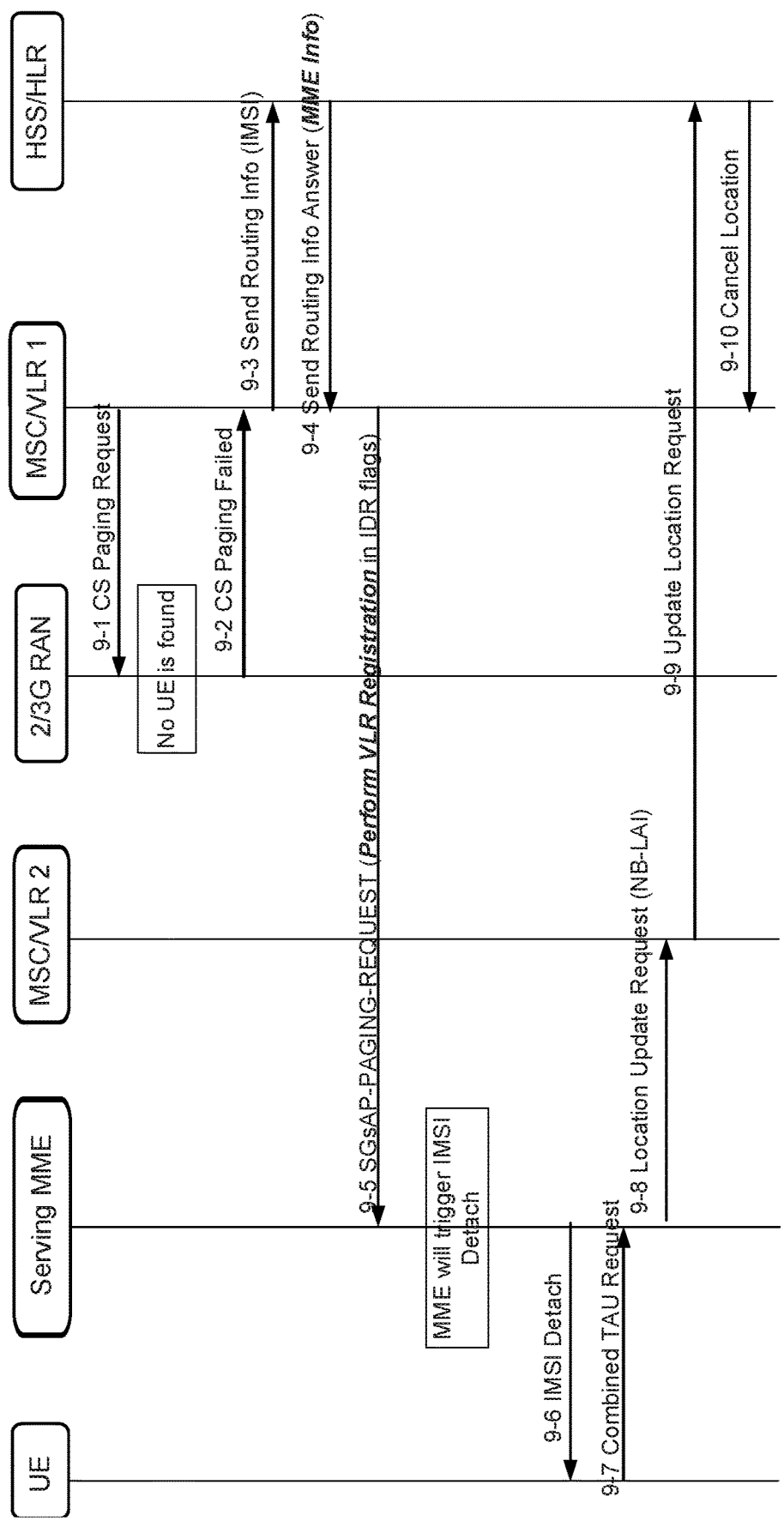
FIG. 9 schematically shows a signaling sequence diagram to which a method for solving a dual VLR issue according to the second embodiment of the present disclosure is applied.

Hereinafter, the method for solving the dual VLR issue according to the second exemplary embodiment (i.e., Solution 2) of the present disclosure will be described in detail in conjunction with a signaling sequence diagram as shown in FIG. 9. In connection with the signaling sequence diagrams of FIG. 9, the method for solving the dual VLR issue according to the second exemplary embodiment (i.e., Solution 2) of the present disclosure as previously described will be understood better.

FIG. 9 schematically shows a signaling sequence diagram to which a method for solving a dual VLR issue according to the second embodiment of the present disclosure is applied. It should be noted that the description below only focuses on signaling related to Solution 2, and other signaling is omitted to avoid obscuring the principle of the present disclosure. In FIG. 9, modification on the signaling related to Solution 2 is shown in Bold Italics.

As previously described, the first MSC/VLR is an MSC/VLR that is considered by the HSS/VLR to be serving the UE, but is actually not serving the UE. Therefore, when the first MSC/VLR transmits a CS Paging Request message to 2G/3G RAN in Signaling 9-1, the 2G/3G RAN cannot find the UE, and thus transmits a CS Paging Failed message to the first MSC/VLR in Signaling 9-2.

The first MSC/VLR may determine that the dual VLR issue occurs based on the received CS Paging Failed message, and thus may generate a message for querying information of an MME that is serving the UE upon determining that the dual VLR issue occurs.

Then in Signaling 9-3, the first MSC/VLR may transmit the message for querying information of an MME that is serving the UE, e.g., in a form of a Send Routing Information message with an IMSI of the UE, to the HSS/HLR.

The HSS/HLR that receives the dual VLR indication may retrieve information of the MME that is serving the UE, e.g., an SGs interface address of the MME.

Then in Signaling 9-4, the HSS/HLR may transmit the information of the MME to the first MSC/VLR, e.g., in a Send Routing Information Answer message.

After receiving the information of the MME from the HSS/HLR, the first MSC/VLR may transmit, in Signaling 9-5, a VLR registration indication, e.g., in an SGsAP-PAGING-REQUEST message, to the MME indicated by the information of the MME to trigger the MME to initiate the process of solving the dual VLR issue.

Upon receiving the VLR registration indication from the first MSC/VLR, the MME may know that the dual VLR issue occurs and determine that the MSC/VLR serving the UE is changed. Then, the MME may initiate, in Signaling 9-6, an IMSI detach to the UE, which in turn transmits a combined TAU request to the MME in Signaling 9-7. During the combined TAU, the MME will fill an IE "old LAI" with an NB-LAI value in a Location Update Request message, and transmit the Location Update Request message with the NB-LAI value to the second MSC/VLR selected by the MME for serving the UE in Signaling 9-8.

Then, the second MSC/VLR that receives the Location Update Request message with the NB-LAI value from the MME transmits an Update Location Request message to the HSS/HLR in Signaling 9-9 to update the UE's information.

As such, the HSS/HLR may update the location information of the UE to establish a connection between the second MSC/VLR and the HSS/HLR.

The HSS/HLR may transmit, in Signaling 9-10, a Cancel Location message to the first MSC/VLR to disconnect the connection between the first MSC/VLR and the HSS/HLR.

Thus, the dual VLR issue may be solved, and the subsequent paging for an MT CS call or an MT SMS will be directed to the correct MSC/VLR that is currently serving the UE, and will not fail.

Figure 10:
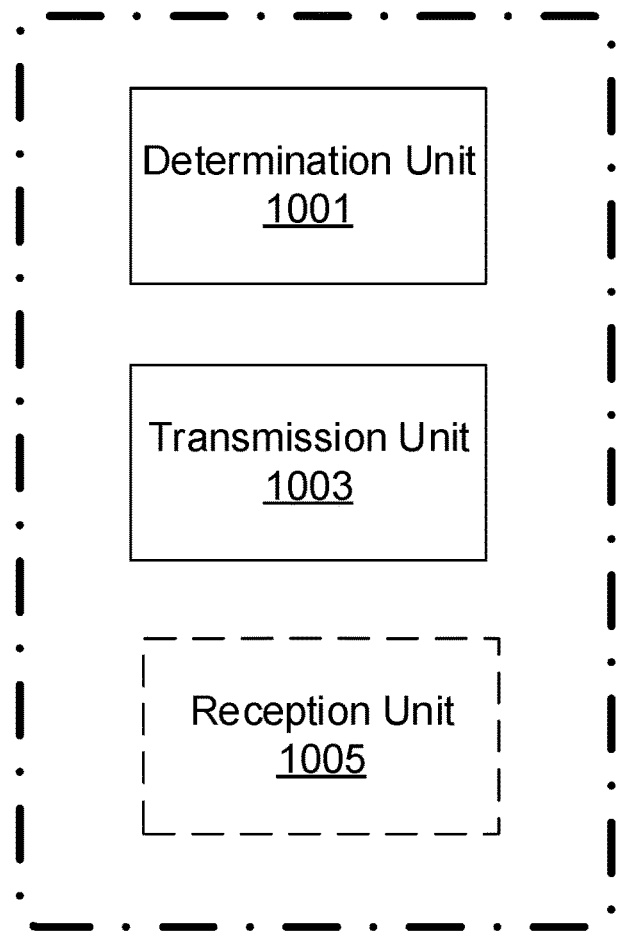
FIG. 10 schematically shows a block diagram of a first MSC/VLR for solving a dual VLR issue according to the first exemplary embodiment of the present disclosure.

Hereinafter, a structure of the first MSC/VLR according to the first exemplary embodiment of the present disclosure will be described with reference to FIG. 10. FIG. 10 schematically shows a block diagram of the first MSC/VLR 1000 according to the first exemplary embodiment of the present disclosure. The first MSC/VLR 1000 in FIG. 10 may perform the method 200 as described previously with reference to FIG. 2. Accordingly, some detailed description on the first MSC/VLR 1000 may refer to the corresponding description of the method 200 in FIG. 2 and the signaling sequence diagram of FIG. 5 as previously discussed, and thus will be omitted here for simplicity.

As shown in FIG. 10, the first MSC/VLR 1000 includes a determination 1001 and a transmission unit 1003.

The determination unit 1001 may determine that a dual VLR issue occurs.

The transmission unit 1003 may transmit a dual VLR indication indicating that the dual VLR issue occurs to the HSS/HLR for the HSS/HLR to trigger the MME that is serving the UE to initiate the process of solving the dual VLR issue.

In an exemplary embodiment, the dual VLR indication is contained in an Update Location Request message.

In an exemplary embodiment, the first MSC/VLR 1000 may further include a reception unit 1005. The reception unit 1005 may receive, from the 2G/3G RAN, a message indicating failure of a CS call paging for the UE.

The determination unit 1001 may determine that the dual VLR issue occurs based on the received message indicating failure of the CS call paging.

Figure 11:
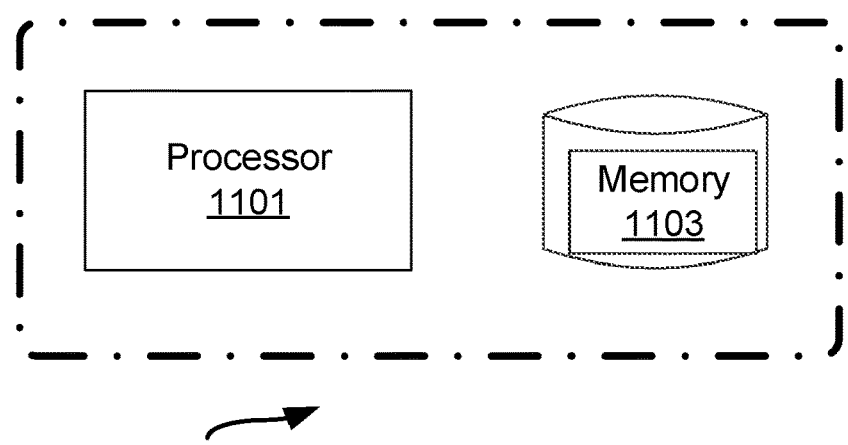
FIG. 11 schematically shows another block diagram of a first MSC/VLR for solving a dual VLR issue according to the first exemplary embodiment of the present disclosure.

Hereinafter, another structure of the first MSC/VLR according to the first exemplary embodiment of the present disclosure will be described with reference to FIG. 11. FIG. 11 schematically shows another block diagram of the first MSC/VLR 1100 according to the first exemplary embodiment of the present disclosure. The first MSC/VLR 1100 in FIG. 11 may perform the method 200 as described previously with reference to FIG. 2. Accordingly, some detailed description on the first MSC/VLR 1100 may refer to the corresponding description of the method 200 in FIG. 2 and the signaling sequence diagrams of FIG. 5 as previously discussed, and thus will be omitted here for simplicity.

As shown in FIG. 11, the first MSC/VLR 1100 includes at least one processor 1101 and at least one memory 1103. The at least one processor 1101 includes e.g., any suitable CPU (Central Processing Unit), microcontroller, DSP (Digital Signal Processor), etc., capable of executing computer program instructions. The at least one memory 1103 may be any combination of a RAM (Random Access Memory) and a ROM (Read Only Memory). The at least one processor memory 1103 may also include persistent storage, which, for example, can be any single one or combination of magnetic memory, optical memory, or solid state memory or even remotely mounted memory.

The at least one memory 1103 stores instructions executable by the at least one processor 1101, whereby the first MSC/VLR 1100 is operative to perform the actions, e.g., of the procedures as described earlier respectively in conjunction with FIG. 2.

In particular, the instructions, when loaded from the at least one memory 1103 and executed on the at least one processor 1101, may cause the first MSC/VLR 1100 to determine that a dual VLR issue occurs; and transmit a dual VLR indication indicating that the dual VLR issue occurs to a HSS/HLR for the HSS/HLR to trigger the MME that is serving the UE to initiate the process of solving the dual VLR issue.

In an exemplary embodiment, the dual VLR indication is contained in an Update Location Request message.

In an exemplary embodiment, the instructions, when loaded from the at least one memory 1103 and executed on the at least one processor 1101, may further cause the first MSC/VLR 1100 to receive, from the 2G/3G RAN, a message indicating failure of a CS call paging for the UE, wherein the dual VLR issue is determined to occur based on the received message indicating failure of the CS call paging.

Figure 12:
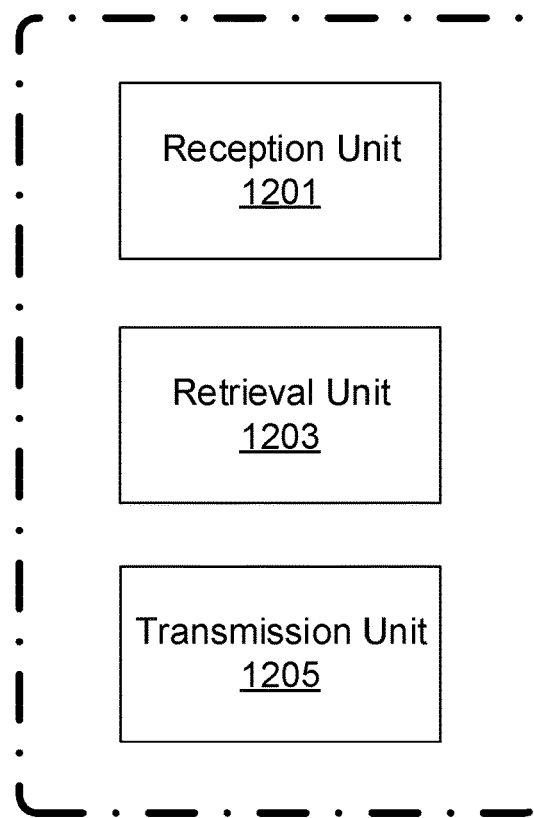
FIG. 12 schematically shows a block diagram of an HSS/HLR for solving a dual VLR issue according to the first exemplary embodiment of the present disclosure.

Hereinafter, a structure of the HSS/HLR according to the first exemplary embodiment of the present disclosure will be described with reference to FIG. 12. FIG. 12 schematically shows a block diagram of the HSS/HLR 1200 according to the first exemplary embodiment of the present disclosure. The HSS/HLR 1200 in FIG. 12 may perform the method 300 as described previously with reference to FIG. 3. Accordingly, some detailed description on the HSS/HLR 1200 may refer to the corresponding description of the method 300 in FIG. 3 and the signaling sequence diagram of FIG. 5 as previously discussed, and thus will be omitted here for simplicity.

As shown in FIG. 12, the HSS/HLR 1200 includes a reception1201, a retrieval unit 1203, and a transmission unit 1203.

The reception unit 1201 may receive, from the first MSC/VLR, the dual VLR indication indicating that the dual VLR issue occurs.

The retrieval unit 1203 may retrieve information of the MME that is serving the UE.

The transmission unit 1203 may transmit a VLR registration indication to the MME indicated by the information of the MME to trigger the MME to initiate the process of solving the dual VLR issue.

In an exemplary embodiment, the dual VLR indication is contained in an Update Location Request message.

In an exemplary embodiment, the VLR registration indication is contained in an IDR message.

In an exemplary embodiment, the reception unit 1201 may further receive, from a second MSC/VLR that is currently selected by the MME for serving the UE, an Update Location Request message for updating the current location of the UE in the HSS/HLR to establish a connection between the second MSC/VLR and the HSS/HLR. The transmission unit 1203 may transmit a Cancel Location message to the first MSC/VLR to disconnect the connection between the first MSC/VLR and the HSS/HLR.

Figure 13:
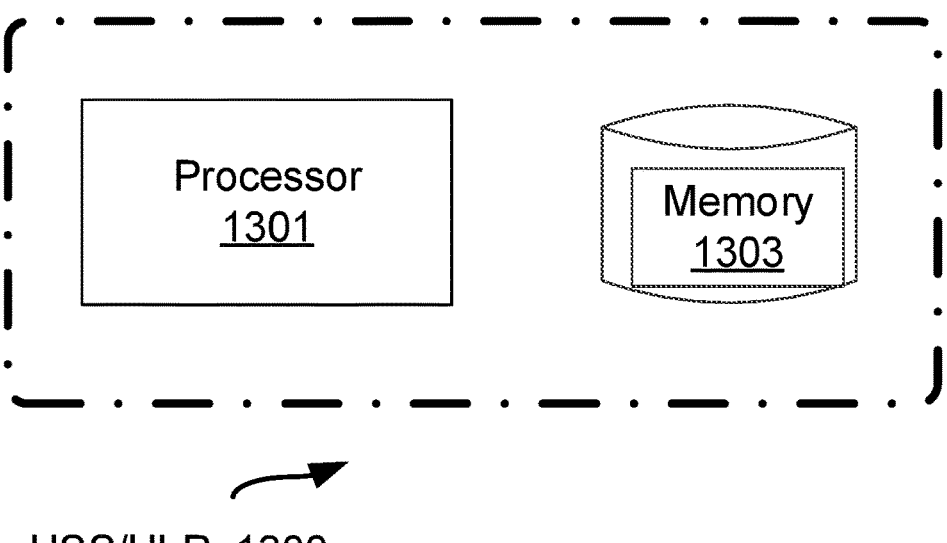
FIG. 13 schematically shows another block diagram of an HSS/HLR for solving a dual VLR issue according to the first exemplary embodiment of the present disclosure.

Hereinafter, another structure of the HSS/HLR according to the first exemplary embodiment of the present disclosure will be described with reference to FIG. 13. FIG. 13 schematically shows another block diagram of the HSS/HLR 1300 according to the first exemplary embodiment of the present disclosure. The HSS/HLR 1300 in FIG. 13 may perform the method 300 as described previously with reference to FIG. 3. Accordingly, some detailed description on the HSS/HLR 1300 may refer to the corresponding description of the method 300 in FIG. 3 and the signaling sequence diagrams of FIG. 5 as previously discussed, and thus will be omitted here for simplicity.

As shown in FIG. 13, the HSS/HLR 1300 includes at least one processor 1301 and at least one memory 1303. The at least one processor 1301 includes e.g., any suitable CPU (Central Processing Unit), microcontroller, DSP (Digital Signal Processor), etc., capable of executing computer program instructions. The at least one memory 1303 may be any combination of a RAM (Random Access Memory) and a ROM (Read Only Memory). The at least one processor memory 1303 may also include persistent storage, which, for example, can be any single one or combination of magnetic memory, optical memory, or solid state memory or even remotely mounted memory.

The at least one memory 1303 stores instructions executable by the at least one processor 1301, whereby the HSS/HLR 1300 is operative to perform the actions, e.g., of the procedures as described earlier respectively in conjunction with FIG. 3.

In particular, the instructions, when loaded from the at least one memory 1303 and executed on the at least one processor 1301, may cause the HSS/HLR 1300 to receive, from the first MSC/VLR, the dual VLR indication indicating that the dual VLR issue occurs; retrieve information of the MME that is serving the UE; and transmit the VLR registration indication to the MME indicated by the information of the MME to trigger the MME to initiate the process of solving the dual VLR issue.

In an exemplary embodiment, the dual VLR indication is contained in an Update Location Request message.

In an exemplary embodiment, the VLR registration indication is contained in an Insert Subscriber Data Request (IDR) message.

In an exemplary embodiment, the instructions, when loaded from the at least one memory 1303 and executed on the at least one processor 1301, may further cause the HSS/HLR 1300 to receive, from the second MSC/VLR that is currently selected by the MME for serving the UE, an Update Location Request message for updating a current location of the UE in the HSS/HLR to establish a connection between the second MSC/VLR and the HSS/HLR; and transmitting a Cancel Location message to the first MSC/VLR to disconnect the connection between the first MSC/VLR and the HSS/HLR.

Figure 14:
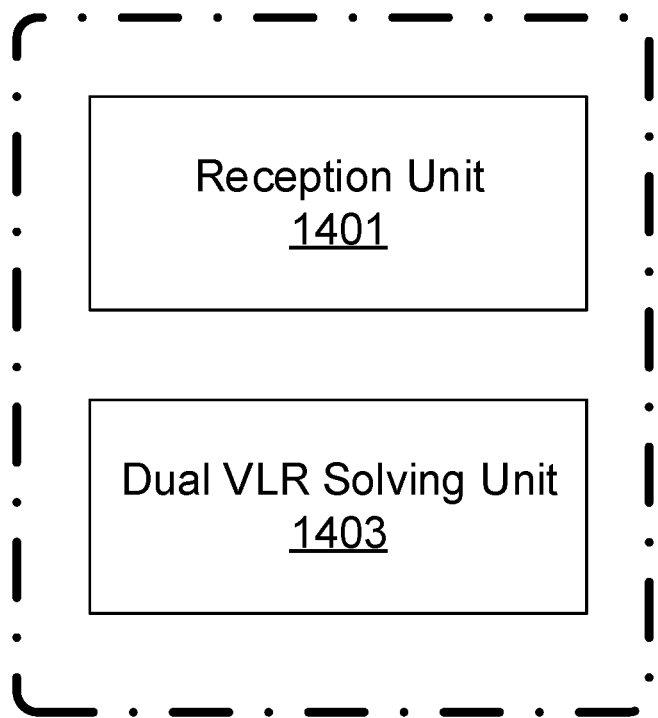
FIG. 14 schematically shows a block diagram of an MME for solving a dual VLR issue according to the first exemplary embodiment of the present disclosure.

Hereinafter, a structure of the MME according to the first exemplary embodiment of the present disclosure will be described with reference to FIG. 14. FIG. 14 schematically shows a block diagram of the MME 1400 according to the first exemplary embodiment of the present disclosure. The MME 1400 in FIG. 14 may perform the method 400 as described previously with reference to FIG. 4. Accordingly, some detailed description on the MME 1400 may refer to the corresponding description of the method 400 in FIG. 4 and the signaling sequence diagram of FIG. 5 as previously discussed, and thus will be omitted here for simplicity.

As shown in FIG. 14, the MME 1400 includes a reception unit 1401 and a dual VLR solving unit 1403.

The reception unit 1401 may receive the VLR registration indication from the HSS/HLR.

The dual VLR solving unit 1403 may initiate the process of solving the dual VLR issue in response to the received VLR registration indication.

In an exemplary embodiment, the VLR registration indication is contained in an IDR message.

In an exemplary embodiment, the dual VLR solving unit 1403 may transmit a Location Update Request message with an NB-LAI to the second MSC/VLR that is currently selected by the MME for serving the UE to make the second MSC/VLR to update a location of the UE in the HSS/HLR.

Figure 15:
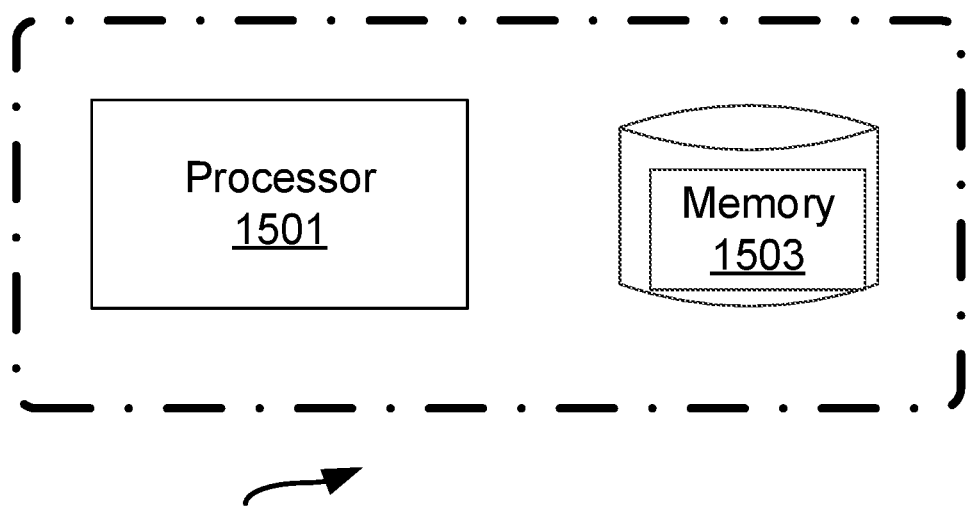
FIG. 15 schematically shows another block diagram of an MME for solving a dual VLR issue according to the first exemplary embodiment of the present disclosure.

Hereinafter, another structure of the MME according to the first exemplary embodiment of the present disclosure will be described with reference to FIG. 15. FIG. 15 schematically shows another block diagram of the MME 1500 according to the first exemplary embodiment of the present disclosure. The MME 1500 in FIG. 15 may perform the method 400 as described previously with reference to FIG. 4. Accordingly, some detailed description on the MME 1500 may refer to the corresponding description of the method 400 in FIG. 4 and the signaling sequence diagrams of FIG. 5 as previously discussed, and thus will be omitted here for simplicity.

As shown in FIG. 15, the MME 1500 includes at least one processor 1501 and at least one memory 1503. The at least one processor 1501 includes e.g., any suitable CPU (Central Processing Unit), microcontroller, DSP (Digital Signal Processor), etc., capable of executing computer program instructions. The at least one memory 1503 may be any combination of a RAM (Random Access Memory) and a ROM (Read Only Memory). The at least one processor memory 1503 may also include persistent storage, which, for example, can be any single one or combination of magnetic memory, optical memory, or solid state memory or even remotely mounted memory.

The at least one memory 1503 stores instructions executable by the at least one processor 1501, whereby the MME 1500 is operative to perform the actions, e.g., of the procedures as described earlier respectively in conjunction with FIG. 4.

In particular, the instructions, when loaded from the at least one memory 1503 and executed on the at least one processor 1501, may cause the MME 1500 to receive the VLR registration indication from the HSS/HLR; and initiating the process of solving the dual VLR issue in response to the received VLR registration indication.

In an exemplary embodiment, the VLR registration indication is contained in an IDR message.

In an exemplary embodiment, the process of solving the dual VLR issue includes: transmitting a Location Update Request message with an NB-LAI to a second MSC/VLR that is currently selected by the MME for serving the UE to make the second MSC/VLR to update a location of the UE in the HSS/HLR.

Figure 16:
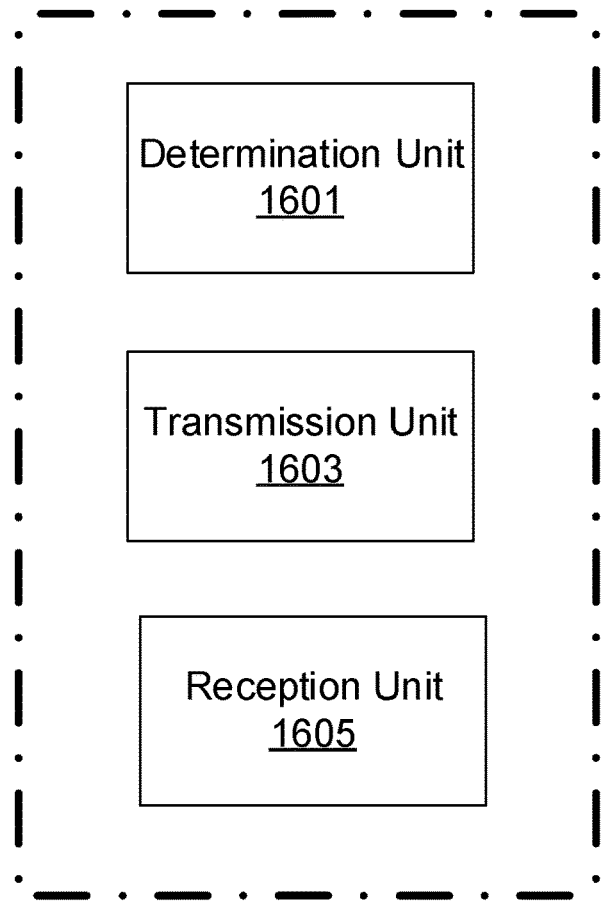
FIG. 16 schematically shows a block diagram of a first MSC/VLR for solving a dual VLR issue according to the second exemplary embodiment of the present disclosure.

Hereinafter, a structure of the first MSC/VLR according to the second exemplary embodiment of the present disclosure will be described with reference to FIG. 16. FIG. 16 schematically shows a block diagram of the first MSC/VLR 1600 according to the second exemplary embodiment of the present disclosure. The first MSC/VLR 1600 in FIG. 16 may perform the method 200 as described previously with reference to FIG. 6. Accordingly, some detailed description on the first MSC/VLR 1600 may refer to the corresponding description of the method 600 in FIG. 6 and the signaling sequence diagram of FIG. 9 as previously discussed, and thus will be omitted here for simplicity.

As shown in FIG. 16, the first MSC/VLR 1600 includes a determination 1601, a transmission unit 1603, and a reception unit 1605.

The determination unit 1601 may determine that a dual VLR issue occurs.

The transmission unit 1603 may transmit, to the HSS/HLR, a message for querying information of the MME that is serving the UE.

The reception unit 1605 may receive the information of the MME from the HSS/HLR.

Then, the transmission unit 1603 may transmit a VLR registration indication to the MME indicated by the information of the MME to trigger the MME to initiate the process of solving the dual VLR issue.

In an exemplary embodiment, the message for querying information of the MME is a Send Routing Information message with an International Mobile Subscriber Identity (IMSI) of the UE; and the information of the MME includes an SGs interface address of the MME, and is contained in a Send Routing Information Answer message.

In an exemplary embodiment, the VLR registration indication is contained in an SGsAP-PAGING-REQUEST message.

In an exemplary embodiment, the reception unit 1605 may further receive, from the 2G/3G RAN, a message indicating failure of CS call paging for the UE. The determination unit 1601 may determine that the dual VLR issue occurs based on the received message indicating failure of CS call paging.

Figure 17:
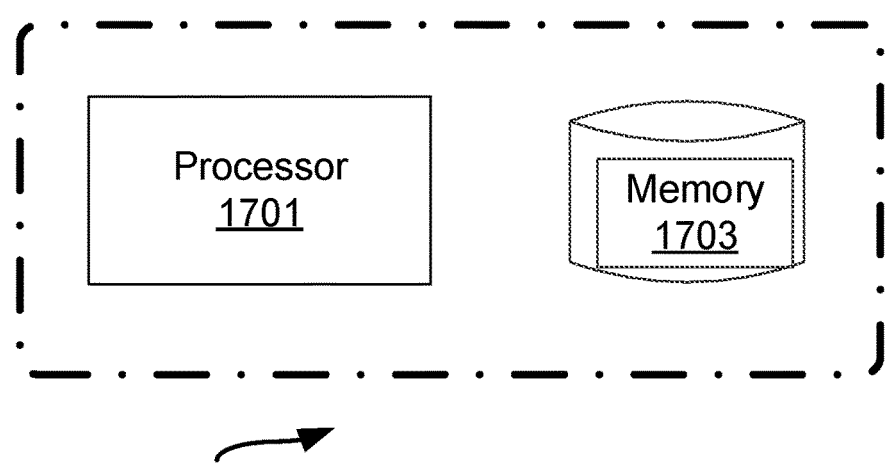
FIG. 17 schematically shows another block diagram of a first MSC/VLR for solving a dual VLR issue according to the second exemplary embodiment of the present disclosure.

Hereinafter, another structure of the first MSC/VLR according to the second exemplary embodiment of the present disclosure will be described with reference to FIG. 17. FIG. 17 schematically shows another block diagram of the first MSC/VLR 1700 according to the second exemplary embodiment of the present disclosure. The first MSC/VLR 1700 in FIG. 17 may perform the method 600 as described previously with reference to FIG. 6. Accordingly, some detailed description on the first MSC/VLR 1700 may refer to the corresponding description of the method 600 in FIG. 6 and the signaling sequence diagrams of FIG. 9 as previously discussed, and thus will be omitted here for simplicity.

As shown in FIG. 17, the first MSC/VLR 1700 includes at least one processor 1701 and at least one memory 1703. The at least one processor 1701 includes e.g., any suitable CPU (Central Processing Unit), microcontroller, DSP (Digital Signal Processor), etc., capable of executing computer program instructions. The at least one memory 1703 may be any combination of a RAM (Random Access Memory) and a ROM (Read Only Memory). The at least one processor memory 1703 may also include persistent storage, which, for example, can be any single one or combination of magnetic memory, optical memory, or solid state memory or even remotely mounted memory.

The at least one memory 1703 stores instructions executable by the at least one processor 1701, whereby the first MSC/VLR 1700 is operative to perform the actions, e.g., of the procedures as described earlier respectively in conjunction with FIG. 6.

In particular, the instructions, when loaded from the at least one memory 1703 and executed on the at least one processor 1701, may cause the first MSC/VLR 1700 to determine that a dual VLR issue occurs; transmitting, to the HSS/HLR, a message for querying information of the MME that is serving the UE; receive the information of the MME from the HSS/HLR; and transmit a VLR registration indication to the MME indicated by the information of the MME to trigger the MME to initiate the process of solving the dual VLR issue.

In an exemplary embodiment, the message for querying information of the MME is a Send Routing Information message with an IMSI of the UE; and the information of the MME includes an SGs interface address of the MME, and is contained in a Send Routing Information Answer message.

In an exemplary embodiment, the VLR registration indication is contained in an SGsAP-PAGING-REQUEST message.

In an exemplary embodiment, the instructions, when loaded from the at least one memory 1703 and executed on the at least one processor 1701, may further cause the first MSC/VLR 1700 to receive, from a 2G/3G RAN, a message indicating failure of CS call paging for the UE, wherein the dual VLR issue is determined to occur based on the received message indicating failure of CS call paging.

Figure 18:
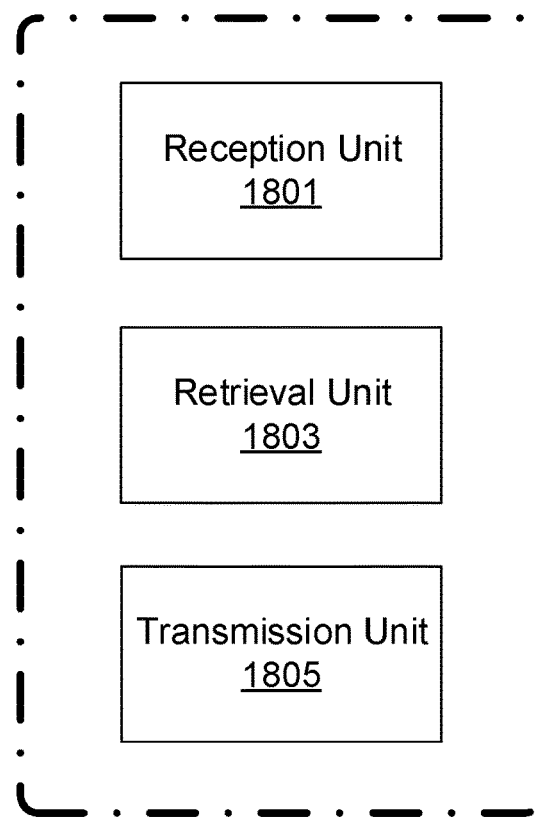
FIG. 18 schematically shows a block diagram of an HSS/HLR for solving a dual VLR issue according to the second exemplary embodiment of the present disclosure.

Hereinafter, a structure of the HSS/HLR according to the second exemplary embodiment of the present disclosure will be described with reference to FIG. 18. FIG. 18 schematically shows a block diagram of the HSS/HLR 1800 according to the second exemplary embodiment of the present disclosure. The HSS/HLR 1800 in FIG. 18 may perform the method 700 as described previously with reference to FIG. 7. Accordingly, some detailed description on the HSS/HLR 1800 may refer to the corresponding description of the method 700 in FIG. 7 and the signaling sequence diagram of FIG. 9 as previously discussed, and thus will be omitted here for simplicity.

As shown in FIG. 18, the HSS/HLR 1800 includes a reception1801, a retrieval unit 1803, and a transmission unit 1803.

The reception unit 1801 may receive, from the first MSC/VLR, a message for querying information of the MME that is serving the UE, in response to the first MSC/VLR determining that the dual VLR issue occurs.

The retrieval unit 1803 may retrieve information of the MME that is serving the UE.

The transmission unit 1803 may transmit the information of the MME to the first MSC/VLR.

In an exemplary embodiment, the message for querying information of the MME is a Send Routing Information message with an IMSI of the UE; and the information of the MME includes an SGs interface address of the MME, and is contained in a Send Routing Information Answer message.

In an exemplary embodiment, the reception unit 1801 may further receive, from a second MSC/VLR that is currently selected by the MME, an Update Location Request message for updating a current location of the UE in the HSS/HLR to establish a connection between the second MSC/VLR and the HSS/HLR; and transmitting a Cancel Location message to the first MSC/VLR to disconnect the connection between the first MSC/VLR and the HSS/HLR.

Figure 19:
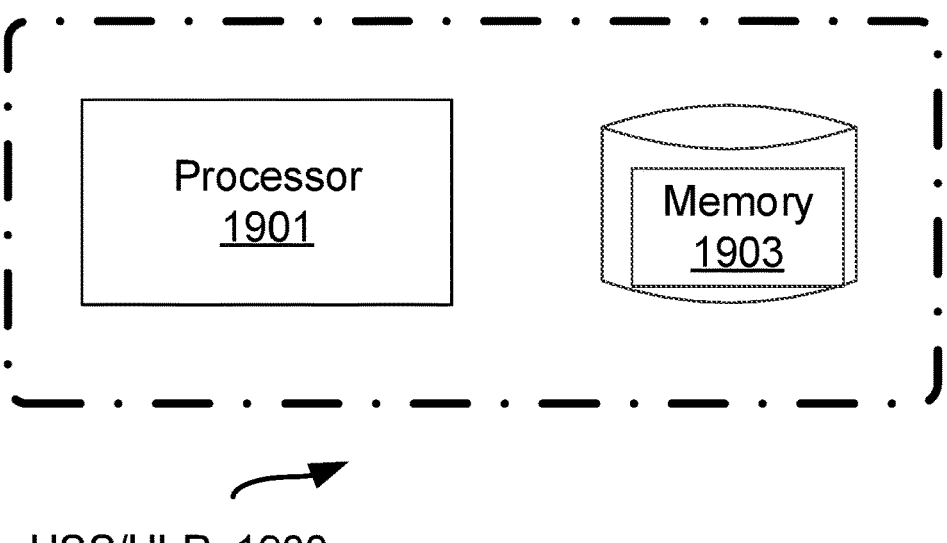
FIG. 19 schematically shows another block diagram of an HSS/HLR for solving a dual VLR issue according to the second exemplary embodiment of the present disclosure.

Hereinafter, another structure of the HSS/HLR according to the second exemplary embodiment of the present disclosure will be described with reference to FIG. 19. FIG. 19 schematically shows another block diagram of the HSS/HLR 1900 according to the second exemplary embodiment of the present disclosure. The HSS/HLR 1900 in FIG. 19 may perform the method 700 as described previously with reference to FIG. 7. Accordingly, some detailed description on the HSS/HLR 1900 may refer to the corresponding description of the method 700 in FIG. 7 and the signaling sequence diagrams of FIG. 9 as previously discussed, and thus will be omitted here for simplicity.

As shown in FIG. 19, the HSS/HLR 1900 includes at least one processor 1901 and at least one memory 1903. The at least one processor 1901 includes e.g., any suitable CPU (Central Processing Unit), microcontroller, DSP (Digital Signal Processor), etc., capable of executing computer program instructions. The at least one memory 1903 may be any combination of a RAM (Random Access Memory) and a ROM (Read Only Memory). The at least one processor memory 1903 may also include persistent storage, which, for example, can be any single one or combination of magnetic memory, optical memory, or solid state memory or even remotely mounted memory.

The at least one memory 1903 stores instructions executable by the at least one processor 1901, whereby the HSS/HLR 1900 is operative to perform the actions, e.g., of the procedures as described earlier respectively in conjunction with FIG. 7.

In particular, the instructions, when loaded from the at least one memory 1903 and executed on the at least one processor 1901, may cause the HSS/HLR 1900 to receive, from a first MSC/VLR, a message for querying information of the MME that is serving the UE, in response to the first MSC/VLR determining that the dual VLR issue occurs; retrieve the information of the MME; and transmit the information of the MME to the first MSC/VLR.

In an exemplary embodiment, the message for querying information of the MME is a Send Routing Information message with an IMSI of the UE; and the information of the MME includes an SGs interface address of the MME, and is contained in a Send Routing Information Answer message.

In an exemplary embodiment, the instructions, when loaded from the at least one memory 1903 and executed on the at least one processor 1901, may further cause the HSS/HLR 1900 to receive, from a second MSC/VLR that is currently selected by the MME, an Update Location Request message for updating a current location of the UE in the HSS/HLR to establish a connection between the second MSC/VLR and the HSS/HLR; and transmit a Cancel Location message to the first MSC/VLR to disconnect the connection between the first MSC/VLR and the HSS/HLR.

Figure 20:
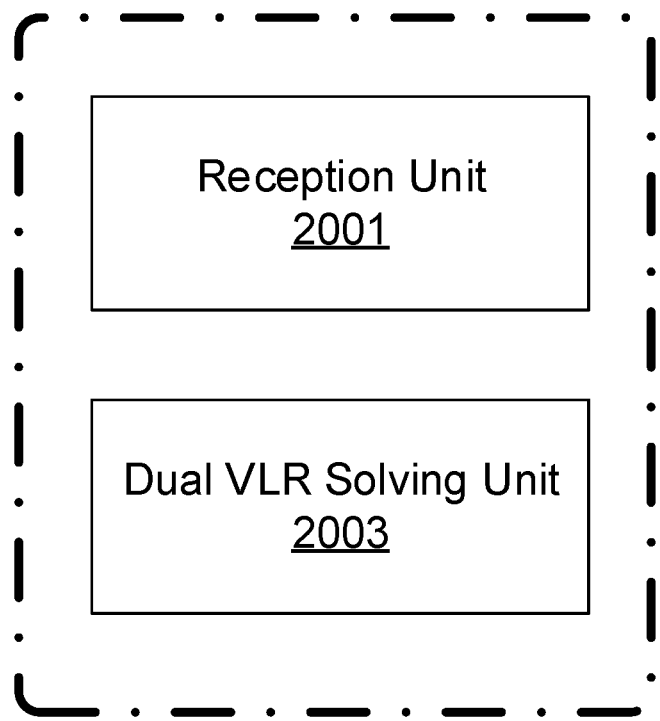
FIG. 20 schematically shows a block diagram of an MME for solving a dual VLR issue according to the second exemplary embodiment of the present disclosure.

Hereinafter, a structure of the MME according to the second exemplary embodiment of the present disclosure will be described with reference to FIG. 20. FIG. 20 schematically shows a block diagram of the MME 2000 according to the second exemplary embodiment of the present disclosure. The MME 2000 in FIG. 20 may perform the method 800 as described previously with reference to FIG. 8. Accordingly, some detailed description on the MME 2000 may refer to the corresponding description of the method 800 in FIG. 8 and the signaling sequence diagram of FIG. 9 as previously discussed, and thus will be omitted here for simplicity.

As shown in FIG. 20, the MME 2000 includes a reception unit 2001 and a dual VLR solving unit 2003.

The reception unit 2001 may receive the VLR registration indication from the first MSC/VLR.

The dual VLR solving unit 2003 may initiate the process of solving the dual VLR issue in response to the received VLR registration indication.

In an exemplary embodiment, the VLR registration indication is contained in an SGsAP-PAGING-REQUEST message.

In an exemplary embodiment, the dual VLR solving unit 2003 may transmit a Location Update Request message with an NB-LAI to a second MSC/VLR that is currently selected by the MME to make the second MSC/VLR to update a location of the UE in the HSS/HLR.

Figure 21:
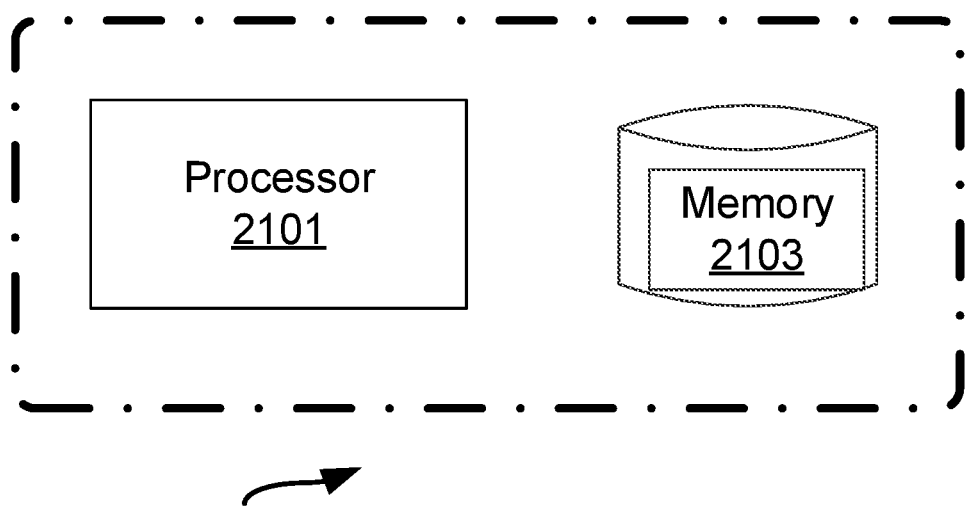
FIG. 21 schematically shows another block diagram of an MME for solving a dual VLR issue according to the second exemplary embodiment of the present disclosure.

Hereinafter, another structure of the MME according to the second exemplary embodiment of the present disclosure will be described with reference to FIG. 21. FIG. 21 schematically shows another block diagram of the MME 2100 according to the second exemplary embodiment of the present disclosure. The MME 2100 in FIG. 21 may perform the method 800 as described previously with reference to FIG. 8. Accordingly, some detailed description on the MME 2100 may refer to the corresponding description of the method 800 in FIG. 8 and the signaling sequence diagrams of FIG. 9 as previously discussed, and thus will be omitted here for simplicity.

As shown in FIG. 21, the MME 2100 includes at least one processor 2101 and at least one memory 2103. The at least one processor 2101 includes e.g., any suitable CPU (Central Processing Unit), microcontroller, DSP (Digital Signal Processor), etc., capable of executing computer program instructions. The at least one memory 2103 may be any combination of a RAM (Random Access Memory) and a ROM (Read Only Memory). The at least one processor memory 2103 may also include persistent storage, which, for example, can be any single one or combination of magnetic memory, optical memory, or solid state memory or even remotely mounted memory.

The at least one memory 2103 stores instructions executable by the at least one processor 2101, whereby the MME 2100 is operative to perform the actions, e.g., of the procedures as described earlier respectively in conjunction with FIG. 8.

In particular, the instructions, when loaded from the at least one memory 2103 and executed on the at least one processor 2101, may cause the MME 2100 to receive the VLR registration indication from the first MSC/VLR; and initiate the process of solving the dual VLR issue in response to the received VLR registration indication.

In an exemplary embodiment, the VLR registration indication is contained in an SGsAP-PAGING-REQUEST message.

In an exemplary embodiment, the process of solving the dual VLR issue includes: transmitting a Location Update Request message with an NB-LAI to a second MSC/VLR that is currently selected by the MME to make the second MSC/VLR to update a location of the UE in the HSS/HLR.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program.

The computer program includes: code/computer readable instructions, which when executed by the at least one processor 1101 causes the first MSC/VLR 1100 to perform the actions, e.g., of the procedure described earlier in conjunction with FIG. 2; or code/computer readable instructions, which when executed by the at least one processor 1301 causes the HSS/HLR 1300 to perform the actions, e.g., of the procedures described earlier respectively in conjunction with FIG. 3; or code/computer readable instructions, which when executed by the at least one processor 1501 causes the MME 1500 to perform the actions, e.g., of the procedures described earlier respectively in conjunction with FIG. 4; code/computer readable instructions, which when executed by the at least one processor 1701 causes the first MSC/VLR 1700 to perform the actions, e.g., of the procedure described earlier in conjunction with FIG. 6; or code/computer readable instructions, which when executed by the at least one processor 1901 causes the HSS/HLR 1900 to perform the actions, e.g., of the procedures described earlier respectively in conjunction with FIG. 7; or code/computer readable instructions, which when executed by the at least one processor 2101 causes the MME 2100 to perform the actions, e.g., of the procedures described earlier respectively in conjunction with FIG. 8.

The computer program product may be configured as a computer program code structured in computer program modules. The computer program modules could essentially perform the actions of the flow illustrated in any of FIGS. 2 to 4 and 6-8.

The processor may be a single CPU (Central processing unit), but could also include two or more processing units. For example, the processor may include general purpose microprocessors; instruction set processors and/or related chips sets and/or special purpose microprocessors such as Application Specific Integrated Circuit (ASICs). The processor may also include board memory for caching purposes. The computer program may be carried by a computer program product connected to the processor. The computer program product may include a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The present disclosure has been described above with reference to embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

The invention claimed is:

1. A method at a first Mobile Switch Center (MSC) or a first Visitor Location Register (VLR), comprising:
   determining that a dual VLR issue occurs; and
   transmitting a dual VLR indication to a Home Subscriber Server (HSS) or a Home Location Register (HLR) for the HSS or the HLR to trigger a Mobility Management Entity (MME) that is serving a user equipment (UE) to initiate a process of solving the dual VLR issue,
   wherein the dual VLR issue occurrence is determined based on receiving a message, indicating failure of a Circuit Switched (CS) call paging for the UE, from a 2G or 3G Radio Access Network (RAN).

2. The method of claim 1, wherein the dual VLR indication is contained in an Update Location Request message.

3. A method at a Home Subscriber Server (HSS) or a Home Location Register (HLR), comprising:
   receiving, from a first Mobile Switch Center (MSC) or a first Visitor Location Register (VLR), a dual VLR indication indicating that a dual VLR issue occurs;
   retrieving information of a Mobility Management Entity (MME) that is serving a user equipment (UE); and
   transmitting a VLR registration indication to the MME indicated by the information of the MME to trigger the MME to initiate a process of solving the dual VLR issue.

4. The method of claim 3, wherein the dual VLR indication is contained in an Update Location Request message.

5. The method of claim 3, wherein the VLR registration indication is contained in an Insert Subscriber Data Request (IDR) message.

6. The method of claim 3, further comprising:
receiving, from a second MSC or a second VLR that is currently selected by the MME, an Update Location Request message for updating a current location of the UE in the HSS or the HLR to establish a connection between the second MSC or the second VLR and the HSS or the HLR; and
transmitting a Cancel Location message to the first MSC or the first VLR to disconnect a connection between the first MSC or the first VLR and the HSS or the HLR.

7. The method of claim 3, further comprising:
receiving, from the first MSC or the first VLR, a message for querying information of the MME that is serving the UE, in response to the first MSC or the first VLR determining that the dual VLR issue occurs;
retrieving the information of the MME; and
transmitting the information of the MME to the first MSC or the first VLR.

8. The method of claim 7, wherein
the message for querying the information of the MME is a Send Routing Information message with an International Mobile Subscriber Identity (IMSI) of the UE, and
the information of the MME comprises an SGs interface address of the MME, and is contained in a Send Routing Information Answer message.

9. The method of claim 7, further comprising:
receiving, from a second MSC or a second VLR that is currently selected by the MME, an Update Location Request message for updating a current location of the UE in the HSS or the HLR to establish a connection between the second MSC or the second VLR and the HSS or the HLR; and
transmitting a Cancel Location message to the first MSC or the first VLR to disconnect a connection between the first MSC or the first VLR and the HSS or the HLR.

10. A method at a first Mobile Switch Center (MSC) or a first Visitor Location Register (VLR), comprising:
determining that a dual VLR issue occurs;
transmitting, to a Home Subscriber Server (HSS) or a Home Location Register (HLR), a message for querying information of a Mobility Management Entity (MME) that is serving a user equipment (UE);
receiving the information of the MME from the HSS or the HLR; and
transmitting a VLR registration indication to the MME indicated by the information of the MME to trigger the MME to initiate a process of solving the dual VLR issue.

11. The method of claim 10, further comprising:
receiving, from a 2G or a 3G Random Access Network (RAN), a message indicating failure of Circuit Switch (CS) call paging for the UE,
wherein the dual VLR issue is determined to occur based on the received message indicating the failure of CS call paging.

12. The method of claim 10, wherein
the message for querying the information of the MME is a Send Routing Information message with an International Mobile Subscriber Identity (IMSI) of the UE, and
the information of the MME comprises an SGs interface address of the MME, and is contained in a Send Routing Information Answer message.

13. The method of claim 10, wherein the VLR registration indication is contained in an SGsAP-PAGING-REQUEST message.

* * * * *